US005648759A

United States Patent [19]

Miller et al.

[11] Patent Number: 5,648,759

[45] Date of Patent: Jul. 15, 1997

[54] FAILSAFE VOLTAGE REGULATOR WITH WARNING SIGNAL DRIVER

[75] Inventors: Roger L. Miller; Timothy T. Regan, both of San Jose, Calif.

[73] Assignee: National Semiconductor Corporation, Del.

[21] Appl. No.: 190,812

[22] Filed: Feb. 2, 1994

[51] Int. Cl.[6] .......... G08B 21/00

[52] U.S. Cl. .......... 340/660; 340/661; 340/664; 364/483; 364/426.015

[58] Field of Search .......... 340/660, 661, 340/664; 364/426.02, 483

[56] References Cited

U.S. PATENT DOCUMENTS

| | | | |
|---|---|---|---|
| 3,911,392 | 10/1975 | Fleagle | 340/660 |
| 3,944,288 | 3/1976 | Bertolasi | 303/21 AF |
| 4,049,326 | 9/1977 | Zobel | 303/92 |
| 4,085,979 | 4/1978 | Leiber et al. | 303/92 |
| 4,219,244 | 8/1980 | Griner et al. | 303/92 |
| 4,335,430 | 6/1982 | Ohmori et al. | 364/426.02 |
| 4,656,588 | 4/1987 | Kubo | 364/426 |
| 4,667,328 | 5/1987 | Imran | 371/61 |
| 4,707,758 | 11/1987 | Matsuda | 361/18 |
| 4,722,576 | 2/1988 | Matsuda | 303/92 |
| 4,836,616 | 6/1989 | Roper | 303/92 |
| 4,917,443 | 4/1990 | Kramer et al. | 303/92 |
| 5,001,641 | 3/1991 | Makino | 364/426.02 |
| 5,016,249 | 5/1991 | Hurst et al. | 371/16.1 |
| 5,126,659 | 6/1992 | Edwards | 324/158 R |
| 5,142,474 | 8/1992 | Miyata et al. | 364/424.03 |
| 5,176,429 | 1/1993 | Junichi et al. | 303/92 |
| 5,193,886 | 3/1993 | Gloceri | 303/92 |
| 5,193,887 | 3/1993 | Bleckmann et al. | 303/92 |
| 5,410,510 | 4/1995 | Smith et al. | 365/201 |

OTHER PUBLICATIONS

Mano, M. Morris, *Computer System Architecture*, Second Edition, Prentice-Hall, Inc., pp. 2-5 (1982).

Duke et al. "Redundancy Technique for Crystal Oscillators" IBM Technical Disclosure Bulletin, vol. 12, No. 1, (Jun. 1969) pp. 147-148.

LM2935 Low Dropout Dual Regulator data sheet, National Semiconductor Application Specific Analog Products Data Book, pp. 3-136 to 3-143 (1995).

LM2925 Low Dropout Regulator with Delayed Reset data sheet, National Semiconductor Application Specific Analog Products Data Book, pp. 3-114 to 3-119 (1995).

LM2926/LM2927, Low Dropout Regulator with Delayed Reset data sheet, National Semiconductor Application Specific Analog Products Data Book, pp. 3-120 to 3-127 (1995).

LM2984 Microprocessor Power Supply System data sheet, National Semiconductor Application Specific Analog Products Data Book, pp. 3-179 to 3-192 (1995).

LMD18400 Quad High Side Driver data sheet, National Semiconductor Application Specific Analog Products Data Book, pp. 3-74 to 3-90 (1995).

DS3668 Quad Fault Protected Peripheral Driver data sheet, National Semiconductor Application Specific Analog Products Data Book, pp. 3-26 to 3-18 (1995).

(List continued on next page.)

*Primary Examiner*—Jeffery Hofsass
*Assistant Examiner*—Julie B. Lieu
*Attorney, Agent, or Firm*—Skjerven, Morrill, MacPherson, Franklin and Friel; Paul J. Winters; T. Lester Wallace

[57] ABSTRACT

A voltage regulator, a device driver, and a warning signal driver are provided on a single voltage regulator integrated circuit. The voltage regulator provides a regulated voltage for external logic such as a microcontroller. The device driver selectively turns on or turns off an external device such as a relay. The warning signal driver outputs a warning signal. The integrated circuit contains sensing circuits which sense if the output voltage is out of proper regulation. In the event of a malfunction, for example when the output voltage is outside a desired voltage range, the device driver shuts off the external device and the warning signal driver generates a warning signal. The integrated circuit may also receive signals from the external logic which cause the integrated circuit to shut off the device or to generate a warning signal.

18 Claims, 19 Drawing Sheets

OTHER PUBLICATIONS

LM1921 1 Amp Industrial Switch data sheet, National Semiconductor Application Specific Analog Products Data Book, pp. 3–44 to 3–48 (1995).

LM9061 Power MOSFET Driver with Lossless Protection data sheet, National Semiconductor Application Specific Analog Products Data Book, pp. 3–62 to 3–73 (1995).

LM2931 Series Low Dropout Regulators data sheet, National Semiconductor Application Specific Analog Products Data Book, pp. 3–128 to 3–135 (1995).

LP2957/LP2957A 5V Low–Dropout Regulator for μP Applications, National Semiconductor data sheet, pp. 1–13 (Jun. 1994).

KEY TO FIG. 8

| | | |
|---|---|---|
| FIG. 8A | FIG. 8B | FIG. 8C |

KEY TO FIG. 9

FAILSAFE VOLTAGE REGULATOR WITH WARNING SIGNAL DRIVER

CROSS-REFERENCES TO RELATED APPLICATIONS

This application is related to and incorporates by reference U.S. patent application Ser. No. 08/191,564 by Roger L. Miller and Thomas P. Harper entitled "CIRCUIT AND METHOD FOR DETERMINING MULTIPLICATIVE INVERSES WITH A LOOK-UP TABLE", U.S. patent application Ser. No. 08/191,823 by Roger L. Miller entitled "DISASTER AVOIDANCE CLOCK FOR ANTI-LOCK BRAKING SYSTEM", and U.S. patent application Ser. No. 08,190,811 by Roger L. Miller and Thomas P. Harper entitled "ANTI-LOCK BRAKING SYSTEM"; all filed on Feb. 2, 1994 and assigned to the same assignee as the present application.

FIELD OF THE INVENTION

This invention relates to an integrated circuit including a voltage regulator, a device driver, and a warning signal driver. More particularly, the present invention relates to an integrated circuit including a voltage regulator, a device driver, and a warning signal driver wherein if the voltage regulator fails to provide a desired output voltage then the device driver stops supplying power to an external device and the warning signal driver provides a signal indicating a malfunction.

BACKGROUND INFORMATION

Anti-lock braking systems are common in automobiles and other vehicles. Typically, such systems attempt to improve control during braking by controlling the amount of slip of each wheel with respect to the road (or other surface on which the wheel is moving). In particular, anti-lock braking systems attempt to prevent the wheels from locking during braking because as is well known, sliding friction is significantly less than frictional forces between a rolling wheel and the road and it is the force between the road and the wheels that stops the automobile.

FIG. 1A represents a vehicle 101 moving with a translational velocity $V_T$ relative to a surface 103. To determine if a wheel 102 is locked, an anti-lock braking system determines a rotational velocity $V_R$ for the wheel 102 and compares the rotational velocity $V_R$ to the translational velocity $V_T$. Rotational velocities of the other wheels of vehicle 101 are similarly determined and compared to the translational velocity $V_T$. A typical anti-lock braking system includes four wheel sensors (one for each wheel), a microcontroller, and a mechanical system for controlling braking pressure on each wheel.

FIG. 1B shows one example of a wheel speed sensor 110 which can be connected to wheel 102. Wheel speed sensor 110 includes an iron gear 114 which rotates at a velocity proportional to the rotational velocity $V_R$ of wheel 102. Teeth 116 of gear 114 rotate relative to a magnet (not shown) and a wire coil 112 so that teeth 116 change a magnetic field through coil 112 and thereby generate an AC voltage in coil 112. The time between peaks in the AC voltage equals the time required for gear 114 to rotate from one tooth 166 to the next.

A microcontroller 120 is coupled to wheel speed sensor 110 and calculates the rotational velocity $V_R$ from 1) the time between peaks in the AC voltage, 2) an angular separation between the teeth 116, and 3) a constant of proportionality between the rotational velocities of gear 114 and wheel 102. Typically, microcontroller 120 receives similar signals from other wheel speed sensors (not shown) and calculates rotational velocities for each of the wheels. Depending on the anti-lock braking system program being executed, microcontroller 120 then compares the rotational velocities $V_R$ to the vehicle translational velocity $V_T$ or calculates the deceleration of each wheel and compares the deceleration of each wheel to the deceleration of the other wheels and to a maximum deceleration characteristic of the vehicle. If a wheel's rotational velocity or deceleration indicates that the wheel is slipping more than is desired, the anti-lock braking system reduces braking pressure for that wheel to reduce sliding and increase the frictional braking force. A typical anti-lock braking system may attempt to maintain a 20% slip between the wheels and the road during braking.

Reducing braking pressure may be accomplished using many different mechanical devices including solenoid valves and pumps. Typically, braking systems use hydraulic pressure on a piston in a cylinder to press a brake shoe against a brake drum or to press a brake pad against a brake rotor and slow rotation of the wheel. Reducing braking pressure can be accomplished with a solenoid 150 that opens a valve and reduces hydraulic pressure in the cylinder.

If a malfunction in the anti-lock braking system causes valves which relieve hydraulic pressure to remain closed, the anti-lock braking system behaves like conventional brakes. The brakes still operate to stop the vehicle, but the brakes can lock. If a malfunction causes valves to remain open, the brakes may not work at all. Accordingly, for safety reasons, anti-lock braking system systems are typically designed so malfunctions disable the anti-lock braking system and leave conventional braking functional.

One method for sensing malfunctions in an anti-lock braking system is to provide a redundant microcontroller 130. The redundant microcontroller 130 receives the same input signals and executes the same software and therefore should generate the same output signals as microcontroller 120. Circuit 140 therefore compares the output signals from microcontroller 120 with the output signals from microcontroller 130. If output signals from microcontrollers 120 and 130 are not the same, there is a malfunction and circuit 140 disables the anti-lock braking system, leaving conventional brakes.

Systems with redundant controllers have several problems. One problem is that typically both microcontrollers execute the same software, so that software errors and events not anticipated by software may not be identified or handled properly. Even when the two controllers execute different software, the identical function of microcontrollers and similarities in programming techniques tend to cause similar software errors. Also, the chance of simultaneous hardware malfunctions is increased because the redundant microcontrollers are identical circuits, formed using same fabrication techniques, and operate in the same environment.

Another disadvantage of two controllers is cost. Two microcontrollers, each of which is adequately powerful to perform all the anti-lock braking system functions by itself, essentially doubles the cost of the electronics. Accordingly, anti-lock braking systems are often only provided as an option in less expensive cars. A low cost anti-lock braking system is needed which provides high reliability even during unanticipated events.

SUMMARY

In accordance with the present invention, a single integrated circuit includes a voltage regulator, a device driver, and a warning signal driver. The integrated circuit may be used in anti-lock braking systems or other systems where a regulated voltage and a safe shut-down in the event of a malfunction are required. Typically, the voltage regulator provides a regulated voltage for use by external logic such as a microcontroller of an anti-lock braking system. The device driver selectively turns on or turns off an external device such as a relay via a signal output from the integrated circuit. The integrated circuit contains sensing circuits which sense if the voltage regulator is malfunctioning, for example if the integrated voltage regulator is not providing an output voltage suitable for operation of the external logic. In the event of a malfunction, the integrated circuit shuts off the external device and generates a warning signal. Accordingly, when the external logic is not receiving a proper supply voltage from the integrated circuit for proper operation of the external logic, the integrated circuit automatically shuts off the external device and provides a warning signal. The integrated circuit may also receive signals from external logic which cause the integrated circuit to shut off the external device or generate a warning signal in selected conditions.

In accordance with a first embodiment of the invention, an integrated circuit includes a voltage regulator for providing a voltage within a predetermined range, a device driver, and a warning signal driver. The warning signal driver generates a warning signal if the voltage regulator is not providing a voltage within the predetermined range. In some embodiments, the integrated circuit further includes a logic circuit which disables the device driver from supplying power to an external device if the voltage regulator is not providing a voltage within the predetermined voltage range. The integrated circuit may further include a thermal shutdown circuit and/or an input voltage overvoltage shutdown circuit which disables the external device and outputs a warning signal if a temperature of the voltage regulator exceeds a threshold temperature and/or if an input voltage exceeds a threshold voltage. The voltage regulator may optionally have an output voltage snap on/off feature which snaps the output voltage to an "off" potential such as ground if the output voltage is not within a predefined voltage range.

In accordance with another embodiment of the invention, an anti-lock braking system includes an integrated circuit having a voltage regulator, a device driver and a warning signal driver. The range of the output voltage from the voltage regulator is suitable for the supply voltage of a microcontroller in the anti-lock braking system. The device driver operates a safety switch capable of disabling the anti-lock braking system and the warning signal driver lights a lamp on the dashboard of a vehicle when the anti-lock braking system is disabled.

In accordance with another embodiment of the invention, a method for operating an anti-lock braking system includes the steps of connecting an integrated voltage regulator to a microcontroller in the anti-lock braking system, connecting the integrated voltage regulator to a safety switch capable of disabling the anti-lock braking system, monitoring an output voltage supplied to the micro-controller by the integrated voltage regulator, and if the output voltage supplied to the microcontroller is outside a predefined range of voltages, disabling the anti-lock braking system using the safety switch. The method also may include connecting the integrated voltage regulator to a warning indicator such that if the output voltage supplied to the microcontroller is outside the predefined range, a warning signal supplied by the integrated voltage regulator lights a warning lamp. The method may also include connecting an input lead of the integrated voltage regulator to the microcontroller, applying an inhibit signal from the microcontroller to the integrated voltage regulator, and disabling the anti-lock braking system and generating a warning signal in response to the inhibit signal.

BRIEF DESCRIPTION OF THE DRAWINGS

Similar or identical items in different figures have the same reference symbols.

DETAILED DESCRIPTION OF THE PREFERRED EMBODIMENTS

Figure 1A:
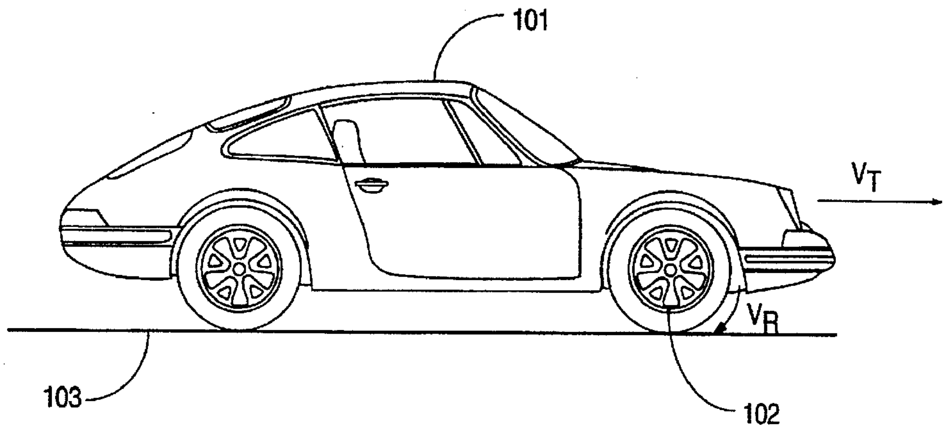
FIGS. 1A and 1B illustrate a conventional prior art anti-lock braking system for a vehicle.
Figure 1B:
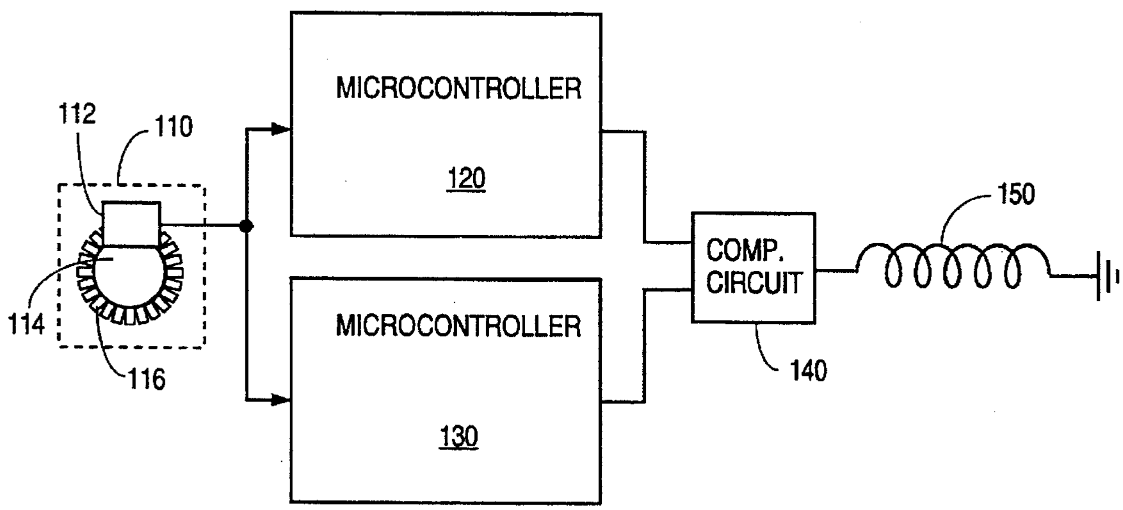
Figure 2A:
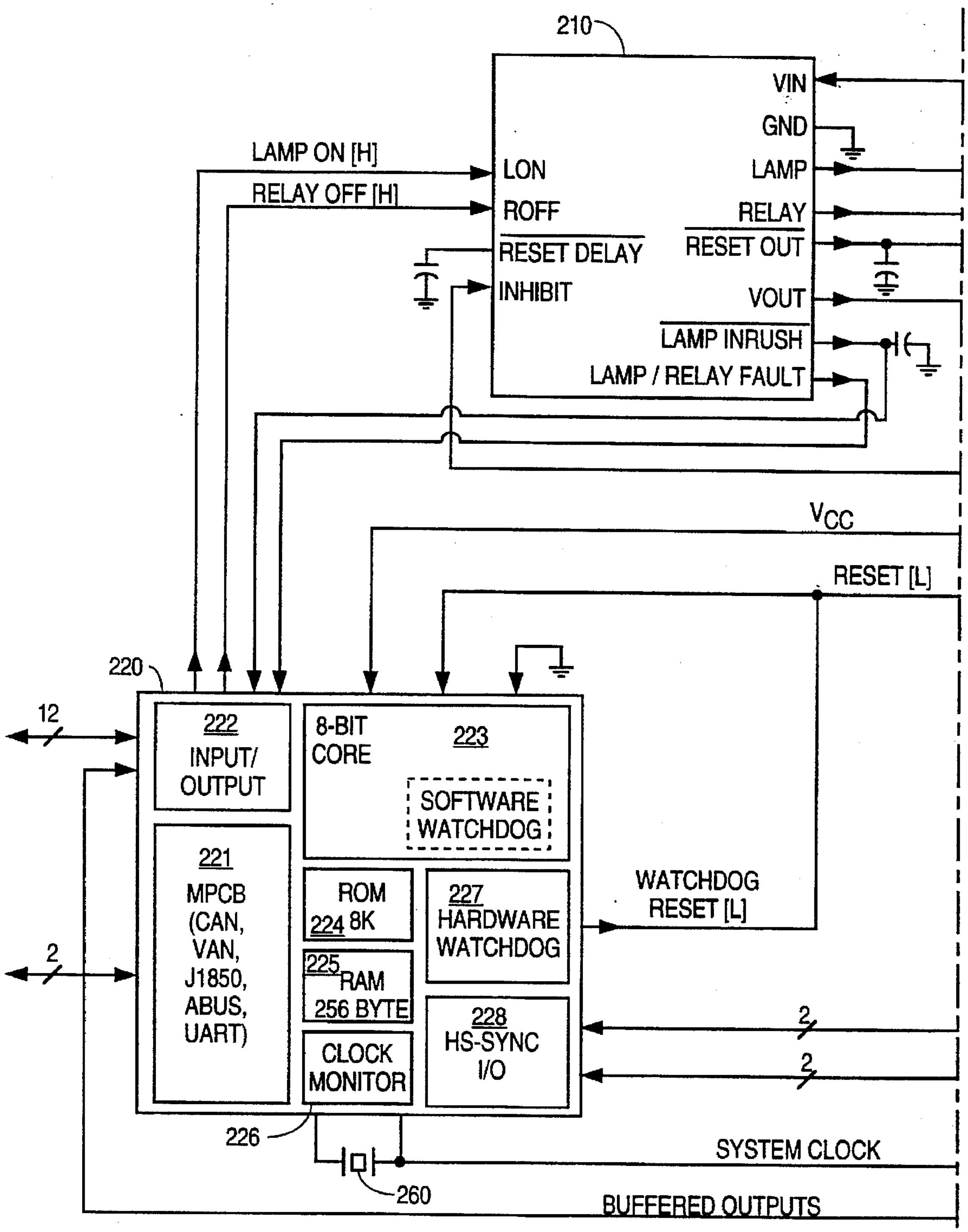
FIGS. 2A and 2B are a block diagram of an anti-lock braking system in accordance with an embodiment of the present invention.
Figure 2:
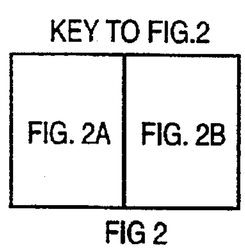
Figure 2B:
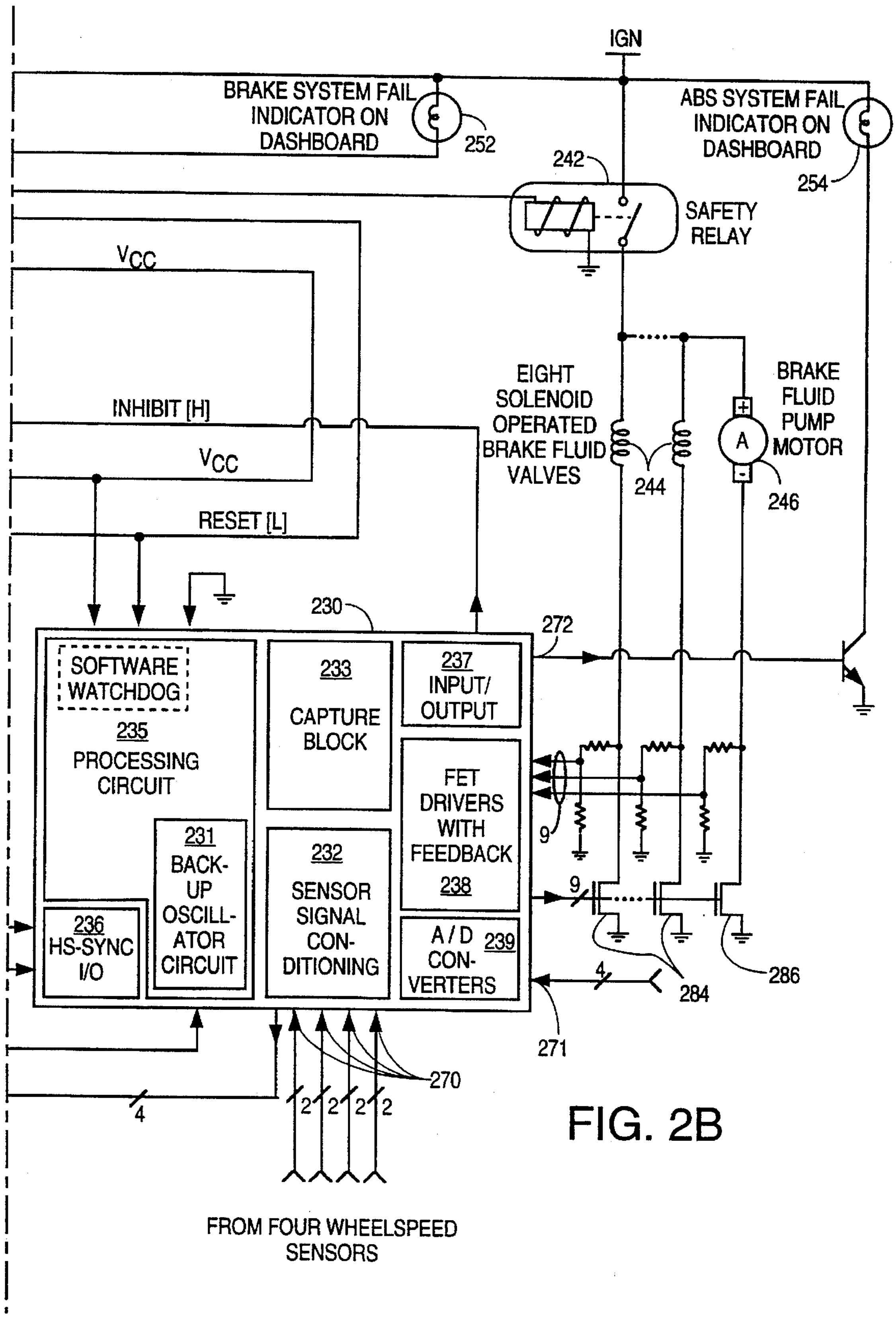

FIGS. 2A and 2B are a block diagram of an anti-lock braking system in accordance with an embodiment of the present invention. The anti-lock braking system contains three integrated circuits 210, 220 and 230 (voltage regulator 210, microcontroller 220, and VRS-processor 230) which co-operate to control warning indicators 252 and 254 and mechanical portions of the anti-lock braking system such as a safety relay 242, solenoid brake fluid valves 244, and a brake fluid pump motor 246. VRS-processor 230 is a microcontroller but is referred to by a different name herein to distinguish the differences in capabilities and functions of the two integrated circuits 220 and 230. VRS stands for variable reluctance sensor indicating that a primary function of VRS-processor 230 is sensing wheel speeds as indicated by changes in a magnetic field in wheel speed sensors.

Each of the three integrated circuits 210, 220, and 230 performs a different function in the anti-lock braking system, has some error checking capabilities, and can issue signals for shutting down the anti-lock braking system. Microcontroller 220 and VRS-processor 230 execute different software routines which check operation of the elements of the anti-lock braking system including the other integrated circuits. Accordingly, each of integrated circuits 210, 220, and 230 senses malfunctions in the other integrated circuits so that a single failed integrated circuit or a single software error does not generally prevent a safe shut-down of the anti-lock braking system. Safe shut-down is thereby accomplished without the expense of a fully redundant system as is common in the prior art.

To increase efficiency and to reduce the probability of an unsafe malfunction, each of the integrated circuits 210, 220, and 230 is formed using a different process technology and different design rules. For example, voltage regulator integrated circuit 210 employs bipolar transistor process technology whereas microcontroller 220 and VRS-processor 230 are formed using CMOS logic process technology. Similarly, 0.8 μm design rules can determine the feature size of circuit elements in VRS-processor 230, while 1.5 μm design rules can determine the feature size of circuit elements in microcontroller 220. Fabrication technology and design rules may be selected for efficient operation of desired functions at required currents, or simply to increase the structural differences of the integrated circuits. The differences in fabrication cause the operating environment of the anti-lock braking system to affect each of the integrated circuits 210, 220, and 230 differently so that simultaneous failures in multiple integrated circuits are less likely to occur than would be the case for identical integrated circuits.

Voltage regulator integrated circuit 210 receives on input terminal VIN an input voltage IGN from an automotive ignition system. The input voltage IGN for a 12 volts ignition system is generally with in the range of 9 to 16 volts above a reference voltage (the ground or chassis voltage). During normal operation of a typical automobile, an engine turns an alternator which is connected to an automotive voltage regulator to provide a voltage high enough to charge a 12 volt battery. Typically, voltage IGN is taken from the battery rather than directly from the alternator to reduce the load on the engine during braking.

Voltage regulator integrated circuit 210 converts the input voltage IGN into a supply voltage VCC and outputs voltage VCC onto output terminal VOUT. The voltage VCC is maintained in a range of voltages suitable for operation of integrated circuits 220 and 230 and is typically between about 4.5 and 5.5 volts. Voltage regulator integrated circuit 210 also contains two driver circuits which provide voltages on output terminal LAMP and on output terminal RELAY for operation of warning indicator 252 and safety relay 242, respectively. The voltages on output terminals LAMP and RELAY selectively turn on or off the respective devices 252 and 242.

Safety relay 242 acts as a master switch for disabling solenoid valves 244 and pump 246. If current is not supplied by voltage regulator integrated circuit 210 to safety relay 242 via the RELAY output terminal, then safety relay 242 is off thereby cutting current to solenoid valves 244 and to pump 246. The anti-lock braking system is therefore disabled and only conventional braking (i.e. braking without anti-lock braking system pressure release) is available.

Voltage regulator integrated circuit 210 contains a sensor circuit which determines whether the output voltage VCC is within the desired operating range of integrated circuits 220 and 230. If the output voltage VCC is outside the desired range, voltage regulator integrated circuit 210 grounds terminal VOUT to prevent damaging integrated circuits 220 and 230, grounds output terminal RELAY to shut off safety relay 242, and grounds output terminal LAMP to pull current through a warning indicator 252 and to warn a user that the anti-lock braking system is not functioning properly. Warning indicator 252 may be for example a dash board light or a buzzer, but other types of warning indicators can be employed. In addition to disabling the anti-lock braking system, a reset signal for integrated circuits 220 and 230 is generated on terminal $\overline{\text{RESETOUT}}$. The reset signal causes integrated circuits 220 and 230 to reset.

Besides supplying power to integrated circuits 220 and 230, safety relay 242, and warning indicator 252, voltage regulator integrated circuit 210 includes sensor circuits which sense malfunctions in relay 242 and warning indicator 252 and provide a fault signal on an output terminal LAMP/RELAY FAULT to indicate a malfunction. Software executed by microcontroller 220 can sense the fault signal and take appropriate actions.

Voltage regulator integrated circuit 210 also includes input terminals LON and ROFF which are connected to microcontroller 220 and an input terminal INHIBIT which is connected to VRS-processor 230. Microcontroller 220 can cause voltage regulator integrated circuit 210 to turn off relay 242 or to turn on lamp 252 by raising the voltage on terminal ROFF or LON, respectively. VRS-processor 230 can cause voltage regulator integrated circuit 210 to turn off relay 242 and to turn on lamp 252 by raising the voltage on input terminal INHIBIT. Accordingly, if either of the integrated circuits 220 and 230 senses a malfunction, the anti-lock braking system may be disabled through voltage regulator integrated circuit 210.

Figure 3A:
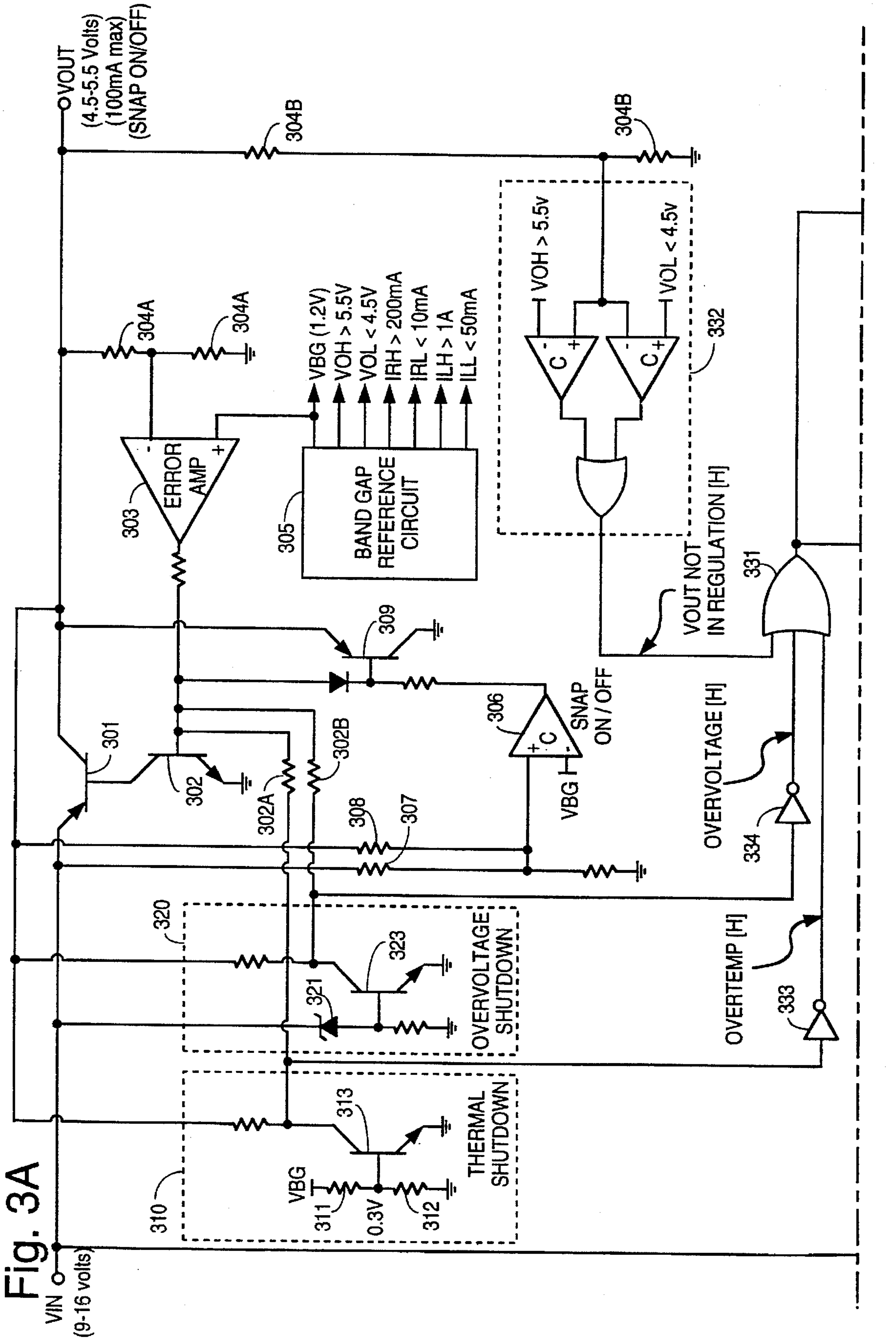
FIGS. 3A, 3B, and 3C are a circuit diagram of a voltage regulator integrated circuit in accordance with an embodiment of the present invention.
Figure 3B:
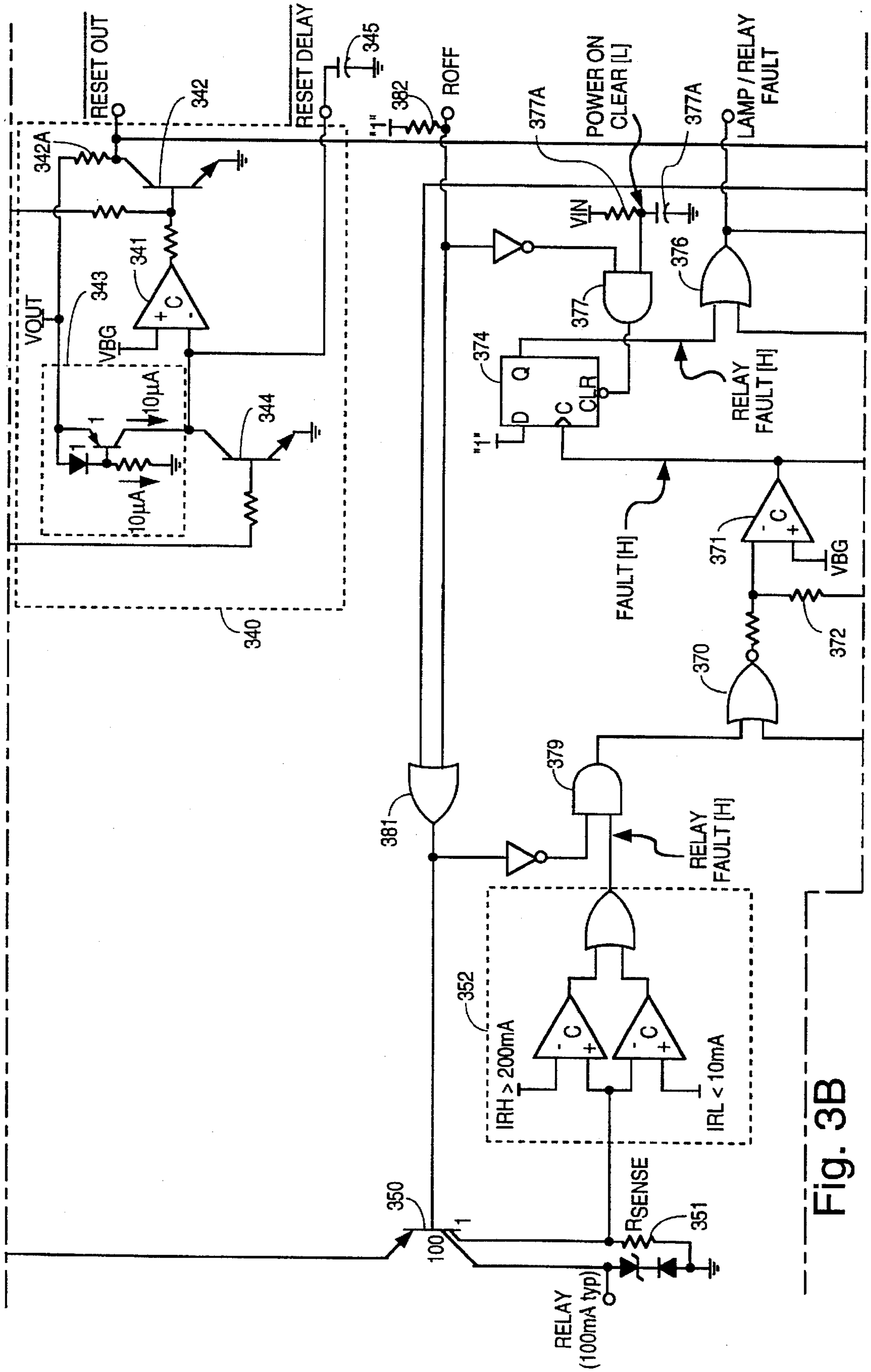
Figure 3C:
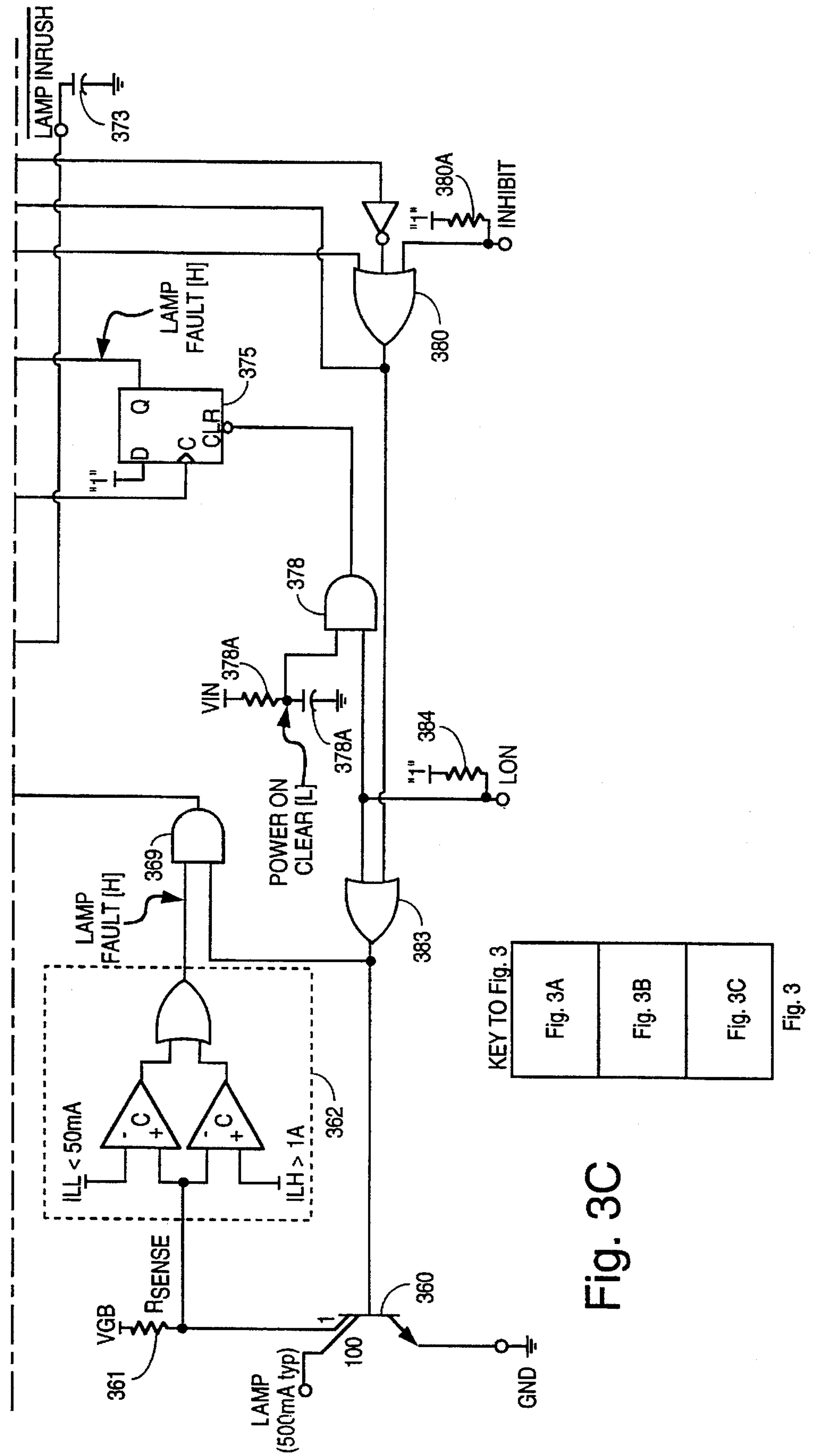

Capacitors are attached to terminals $\overline{\text{RESETDELAY}}$ and $\overline{\text{LAMPINRUSH}}$ of voltage regulator 210 to control the duration of a reset signal on terminal $\overline{\text{RESETOUT}}$ and the delay before an error condition is detected by the voltage regulator integrated circuit 210 as a result of an inrush of current into the terminal LAMP. One embodiment of a voltage regulator integrated circuit in accordance with the invention is shown in FIGS. 3A, 3B, and 3C and disclosed in greater detail below.

VRS-processor 230 preprocesses wheel speed data for microcontroller 220 and generates signals for individually controlling pump motor 246 and each of the solenoid valves 244. In operation, four pairs of input terminals 270 receive signals from four wheel sensors (not shown). Typically, the signals from the wheel sensors are differential AC voltages that have peaks which are separated by a time required for the wheel to rotate a fixed distance. Such sensors are well known in the art.

Figure 4:
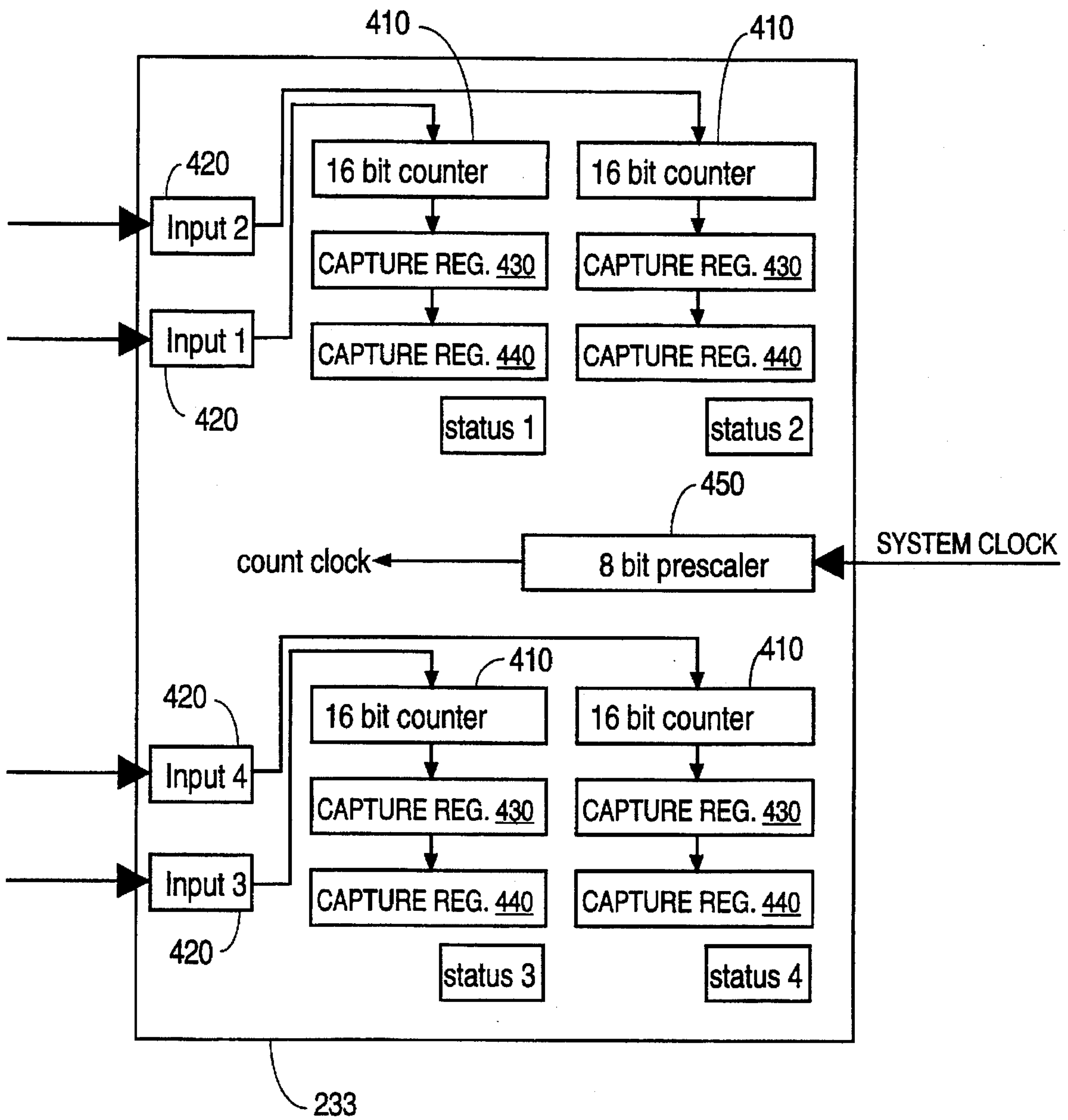
FIG. 4 is a block diagram of a capture block for determining time counts from signals provided by wheel speed sensors.

Capture block 233 typically contains four counters (one for each wheel speed sensor) and a memory for storing time counts. FIG. 4 shows an example of a capture block 233 in integrated circuit 230. Counters 410 are incremented according to a signal COUNT CLOCK having a typical frequency of about 1 MHz so that counters 410 hold time counts indicating time in microseconds. An 8-bit prescaler 450 divides down an input signal SYSTEM CLOCK by a programmable quantity to provide the signal COUNT CLOCK. The signal SYSTEM CLOCK is typically derived from a primary oscillator including an external crystal 260.

A sensor signal conditioning circuit 232 in FIG. 2B conditions input signals from the wheel speed sensors to provide a sharp voltage transition for triggering. For example, sensor signaling conditioning circuit 232 can monitor the input AC voltage and provide a conditioned voltage signal that is set to VCC while the input AC voltage is above a programmable voltage threshold and set to ground while the input AC voltage is below the programmable voltage threshold. The conditioned voltage signals are applied to inputs 420 in FIG. 4.

Each positive edge of a conditioned voltage signal triggers storing of a time count from a corresponding counter 410 into a corresponding first capture register 430. At substantially the same time, a previous time count is moved from the first capture register 430 to a corresponding second capture register 440, and the corresponding counter 410 is reset. A corresponding status register is set to indicate if an error occurred such as a zero count or an overflow time count.

A processing circuit 235 in FIG. 2B executes software that reads time counts from the capture registers and determines wheel velocities and acceleration. Velocity and acceleration can be determined according to software using a math unit containing a conventional multiplier or a divider or using a look-up table in ROM as disclosed in the co-owned U.S. patent application entitled "CIRCUIT AND METHOD FOR DETERMINING MULTIPLICATIVE INVERSES WITH A LOOK-UP TABLE", incorporated by reference above.

Processing circuit 235 also implements communications with microcontroller 220, controls generation of signals which control mechanical portions of the anti-lock braking system, and responds to detected malfunctions. Because VRS-processor 230 shares processing tasks with microcontroller 220, processing circuit 235 typical provides only 8-bit processing, rather than 16-bit processing which is common in other anti-lock braking systems. Processing circuit 235 may implement a custom instruction set or a standardized instruction set such as the COP888 instruction set. The instruction set for a COP888 is publicly known and described in the 1992 Embedded Controllers Data Book available from National Semiconductor, Inc. Software for processing circuit 235 can be stored in an on-chip non-volatile memory such as a ROM, EPROM, or EEPROM or in an external non-volatile memory.

By conditioning the AC voltages from the wheel speed sensors and by calculating velocities and acceleration, VRS-processor 230 performs the majority of what would otherwise be interrupt driven tasks of the anti-lock braking system and therefore reduces interrupts of software executed by microcontroller 220. However, the conditioned AC voltages from sensor conditioning circuit 232 are provided to microcontroller 220 as signals BUFFERED OUTPUTS so that microcontroller 220 can calculate velocities and accelerations from signals BUFFERED OUTPUTS and check the accuracy of velocity and acceleration values calculated by VRS-processor 230.

Velocity and acceleration values are transmitted to microcontroller 220 via a high speed synchronous communication channel based on a modified μWire interface and implemented by I/O port 236. Over a second high speed synchronous channel based on the μWire interface, microcontroller 220 transmits instructions to VRS-processor 230 indicating when brakes should be released. μWire is a publicly known standard interface for the COP800 family of microcontrollers and is described in the Embedded Controllers Data Book, application note 579 available from National Semiconductor, Inc.

To keep integrated circuits 220 and 230 synchronized during communications, both integrated circuits 220 and 230 are connected to a primary oscillator which includes the external crystal 260 and circuitry in integrated circuit 220. The primary oscillator generates the clock signal SYSTEM CLOCK for integrated circuits 220 and 230. In other embodiments, the primary oscillator includes circuitry on integrated circuit 220 as well as an external RC network or ceramic resonator. In still another embodiment, an external oscillator generates a clock signal and then supplies the clock signal to integrated circuits 220 and 230. In addition, processing circuit 235 contains a back-up oscillator circuit 231 such as the circuit shown in FIG. 5 and disclosed in greater detail below. The back-up oscillator circuit 231 allows VRS-processor 230 to continue executing software and to safely shut down the anti-lock braking system in the event that a clock signal is not received from the primary oscillator.

Upon receiving a command from microcontroller 220 indicating that a brake should be released, processing circuit 235 causes an appropriate FET driver circuit 238 to turn on appropriate ones of transistors 284. FET driver circuit 238 has the capability of controlling up to nine discrete transistors 284. Assuming safety relay 242 is turned on and solenoid valves 244 and pump motor 246 are working properly, turning on transistor 286 and one of transistors 284 activates a corresponding solenoid valve 244 and releases brake pressure for a wheel corresponding to the transistor 284.

FET driver circuit 238 contains a feedback sensor circuit which monitors voltage levels in the anti-lock braking system to sense malfunctions. In the embodiment of FIGS. 2A and 2B the feedback sensor circuit monitors the drain voltage of N-channel transistors 284 and 286. A malfunction in solenoid valves 244, pump motor 246, transistors 284, or transistor 286, typically changes drain voltages from the levels expected when there is no malfunction. For example, if one of the transistors 284 is shorted to ground, the corresponding drain voltage would be low even when the transistor is controlled to be off. The corresponding feed back sensor circuit senses the unexpected voltage and indicates a malfunction to processing circuit 235. The malfunction can be handled by software executed by processing circuit 235 and/or can be transmitted to microcontroller 220 via the μWire interface 236, 228. Typically, VRS-processor software responds to the malfunction by shutting off all of the transistors 284 and 286 and sending an inhibit signal to voltage regulator integrated circuit 210 so that voltage regulator integrated circuit 210 can turn off safety relay 242 and can turn on warning indicator 252. Additionally, a warning signal is generated on terminal 272 so that a second warning indicator 254 is turned on. In another embodiment, terminal 272 of VRS-processor 230 is coupled to warning indicator 252 so that either voltage regulator integrated circuit 210 or VRS-processor 230 can turn on warning indicator 252.

Processing circuit 235 may also provide a software malfunction sensor such as a software watchdog that monitors expected communications from microcontroller 220. If a proper communication does not occur within an allotted time, the VRS-processor 230 disables the anti-lock braking system via a wire-OR connected reset line and/or the inhibit signal.

VRS-processor 230 includes four analog input terminals 271 and corresponding analog-to-digital (A/D) converter(s) 239. In one embodiment, a single A/D converter 239 is connected to terminals 271 through a multiplexer. In another embodiment, four A/D converters are provided, one for each analog input terminal. A/D converter(s) 239 provide digital measurements of voltages such as the ignition voltage IGN, the voltage applied to pump motor 246, and other signals as desired by the anti-lock braking system designer. The digital values are usable by VRS-processor 230 and can be transmitted to microcontroller 220.

Input/output circuit 237 provides general purpose digital I/O which is controlled by processing circuit 235. A variety of I/O terminals may be provided such as bi-directional I/O pins, dedicated output pins with pull-down or pull-up resistors, and dedicated Schmitt Trigger input pins.

Microcontroller 220 executes the main anti-lock braking system program. Microcontroller 220 optionally communicates with an external microprocessor (not shown) located elsewhere in the vehicle, handles communications with VRS-processor 230, checks for malfunctions, and determines when a brake should be released to stop a brake from locking. In one embodiment, microcontroller 220 contains an 8-bit core processing circuit 223 which uses 8K bytes of ROM 224 and 256 bytes of RAM 225. 8-bit core 223 may implement a custom instruction set or a standardized instruction set such the COP888 instruction set. In one embodiment, 8-bit core 223 is based on a modified Harvard architecture including a 16-bit timer block and an interrupt block which supports 16 vectored interrupts. In another embodiment, a hardware multiply/divide circuit is provided.

Prior art systems may use 16-bit processing because 8-bit processing may not be fast enough to perform all the calculations needed for an anti-lock braking system program. In accordance with the present invention, an 8-bit processing circuit is sufficient because processing is performed in parallel with VRS-processor 230 which calculates rotational velocities and handles most interrupt driven tasks. 8-bit processing is generally less expensive than 16-bit processing and makes anti-lock braking systems in accordance with the present invention less expensive.

Communication with the external microprocessor (not shown) is carried out via a multi-protocol control block (MPCB) 221. Such communication can, for example, convey wheel velocities to other systems in the vehicle. MPCB 221 would typically implement one of the standard automotive electronics protocols such as CAN, VAN, J1850, ABUS, or UART (RS232) protocols. In one embodiment, MPCB 221 contains a full duplex, double-buffered UART interface with a selectable baud rate generator. The UART interface is capable of full duplex operation, has a fully programmable serial interface, has status report capabilities, accepts two interrupt sources, and is capable of operating in a receiver wake-up mode. Communication between microcontroller 220 and VRS-processor 230 is via a high-speed synchronized I/O port 228 which operates in a similar or identical fashion to I/O port 236 disclosed above. General purpose I/O similar to those described above with regard to input/output circuit 237 is provided through input/output circuit 222.

Microcontroller 220 also contains sensors for detecting malfunctions in the anti-lock braking system. In one embodiment, a hardware watchdog circuit 227 checks for proper communications between microcontroller 220 and VRS-processor 230 within a preset time period. If proper communications do not occur, a reset is generated via the wire-OR reset line. The reset causes a hardware reset which may correct a software error such as an infinite loop preventing proper operation of the braking system. A software watch dog may also be employed. In response to software detection of a malfunction, a reset signal can be asserted onto the wire-OR reset line and/or signals LAMP ON or RELAY OFF can be sent to terminal LON and ROFF of voltage regulator integrated circuit 210 to turn on warning indicator 252 or turn off safety relay 242.

Clock monitor circuit 226 senses if the signal SYSTEM CLOCK from the primary oscillator falls below a predetermined frequency or is out of voltage tolerance. If the signal SYSTEM CLOCK is inadequate, clock monitor circuit 226 periodically generates a signal RESET to reset the system. Even if the signal SYSTEM CLOCK is so inadequate that microcontroller 220 cannot operate, VRS-processor 230 can still execute a shutdown routine using its on-board back-up oscillator circuit 231 as disclosed in more detail below.

Figure 6A:
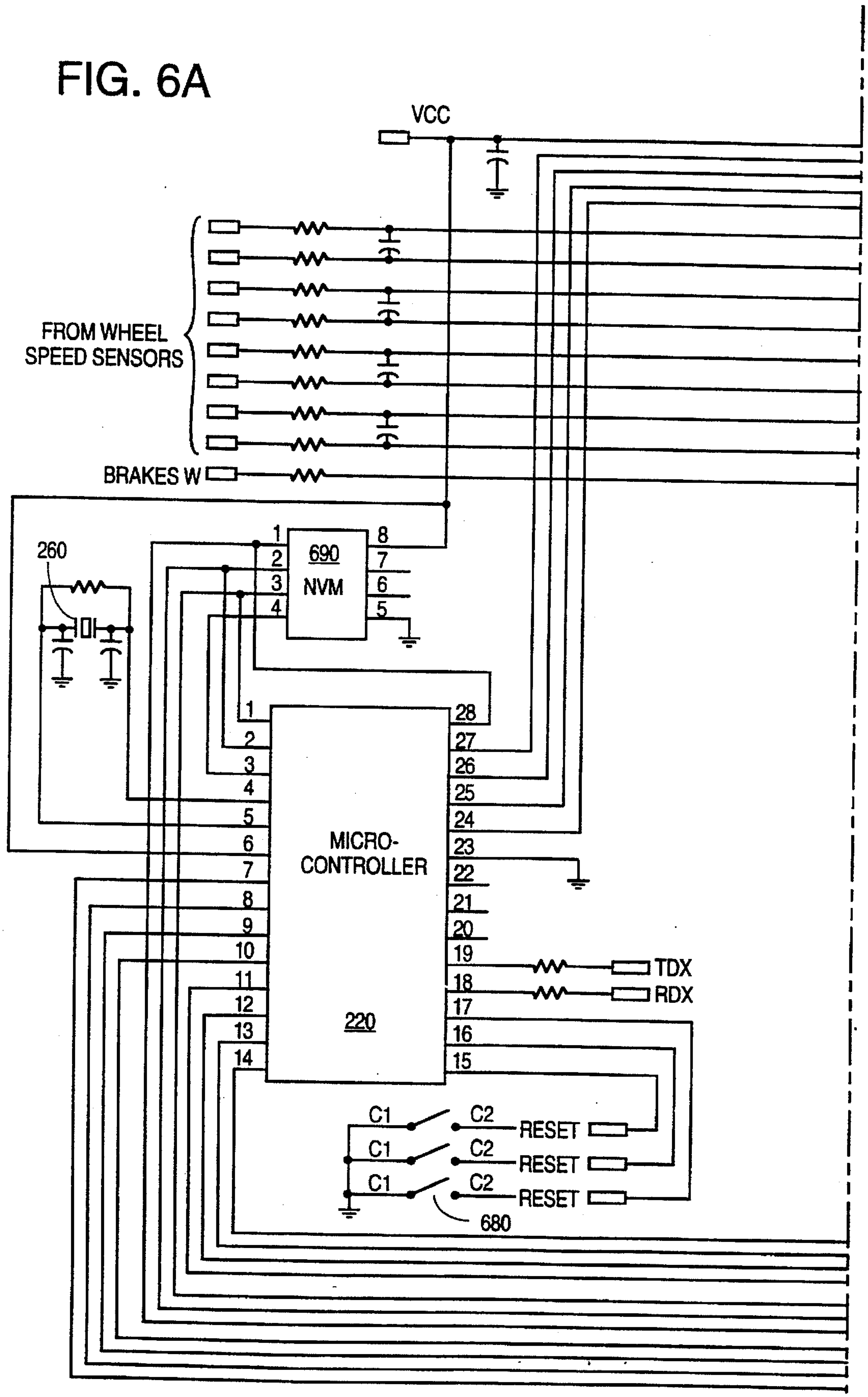
FIGS. 6, 7, 8, and 9 are circuit diagrams of alternative embodiments of anti-lock braking systems in accordance with the present invention.
Figure 6B:
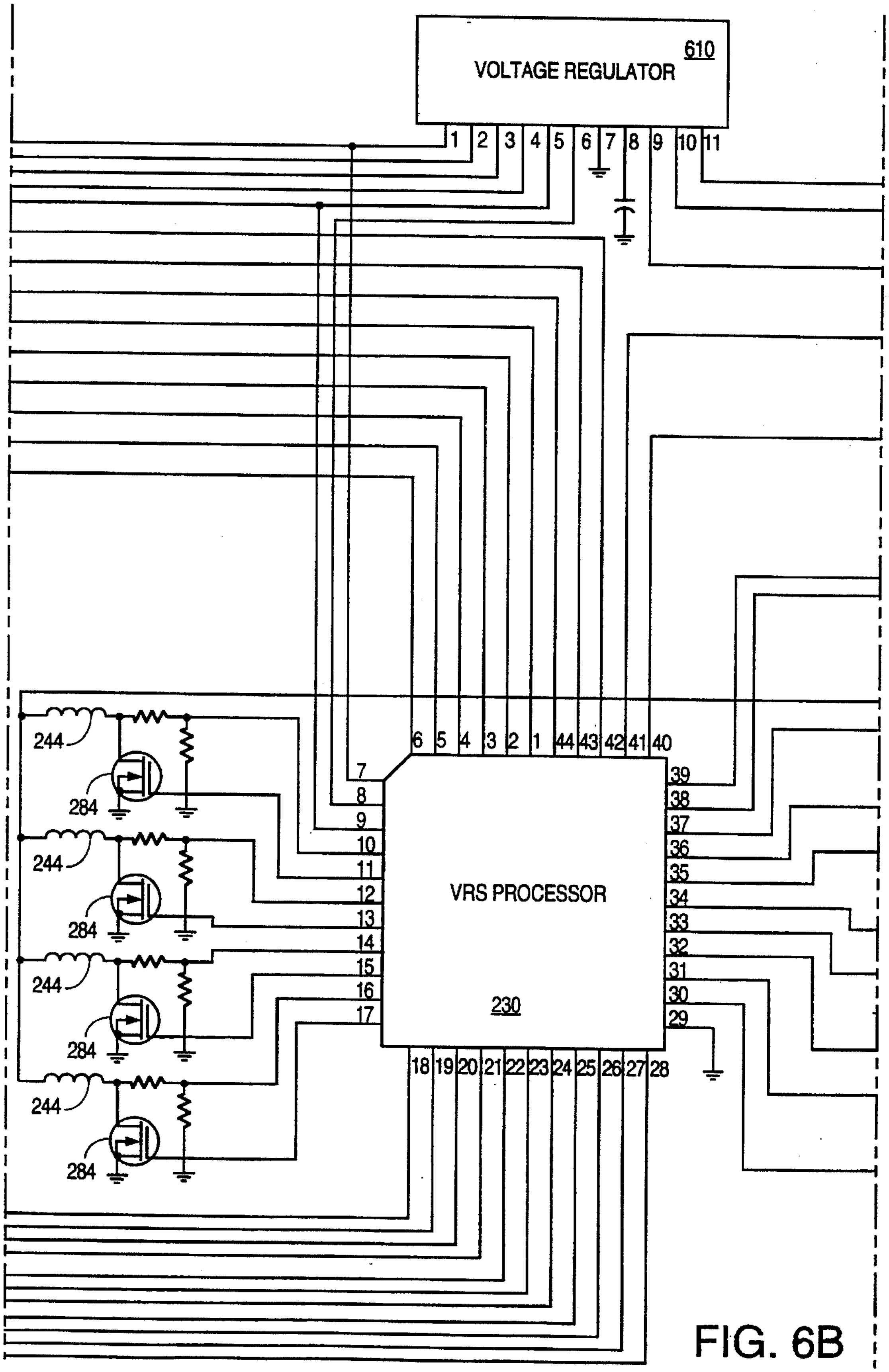
Figures 6, 6C:
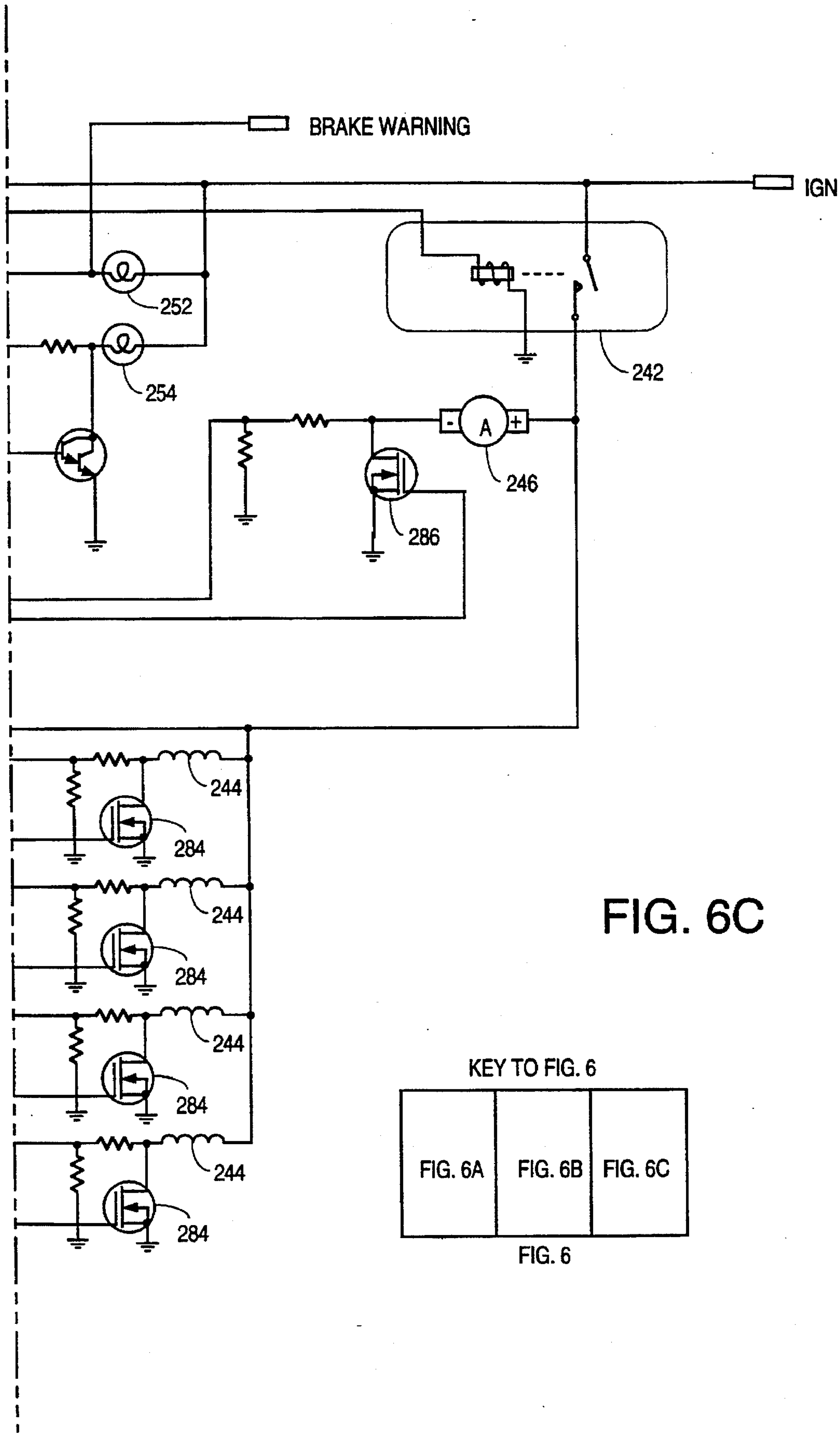

Alternative embodiments of anti-lock braking system in accordance with the present invention are shown in FIGS. 6, 7, 8, and 9. FIG. 6 shows an anti-lock braking system which is similar to the anti-lock braking system shown in FIGS. 2A and 2B. The embodiment of FIG. 6 includes a voltage regulator integrated circuit 610, a microcontroller 220, and a VRS-processor 230 which perform the functions as described above. In addition, the anti-lock braking system of FIG. 6 contains a non-volatile memory (NVM) 690 into which microcontroller 220 and/or VRS-processor 230 writes failure information. The failure information indicates the reason that the anti-lock braking system failed so that a malfunction can be diagnosed.

In the embodiment of FIG. 6, voltage regulator 610 has an 11-pin package, one pin for each of the twelve terminals of voltage regulator 210 of FIG. 2A with the exception that no pin is provided for the LAMP INRUSH terminal. When the voltage regulator integrated circuit 610 is used with a microcontroller such as microcontroller 220, microcontroller software can check the timing when a warning lamp is initially supplied with power.

In FIG. 6, VRS-processor 230 has a 44-pin package. Nine of the pins are pins coupled to nine discrete transistors 284 and 286 which operate eight solenoid valves (two for each wheel) and a single pump motor, nine pins are provided for the feed back sensor circuit to monitor the drain voltages of transistors 284 and 286, two pins are provided for activation and monitoring of a warning indicator 254, eight pins are connected to four wheel speed sensors, one pin is provided for receiving a signal BRAKESW which indicates a brake pedal is being pressed, three pins are connected to voltage regulator integrated circuit 610 for VCC, reset, and inhibit signals, one pin is connected to ground, three pins are connected to NVM 690, and eight pins are connected to microcontroller 220.

In FIG. 6, microcontroller 220 has a 28-pin package. Of the twenty eight pins, three are unused, five are connected to voltage regulator 610 for VCC, reset, lamp on, relay off, and fault signals, eight are connected to VRS-processor 230 for communication of data and clock signals, four are connected to NVM 690, two are connected to oscillator 260, one is connected to ground, three are connected to hydraulic pressure reset switches 680 which reset the system if hydraulic pressure fails, and two are provided for transmitting and receiving signals TDX and RDX from an automotive microprocessor (not shown).

Figure 7A:
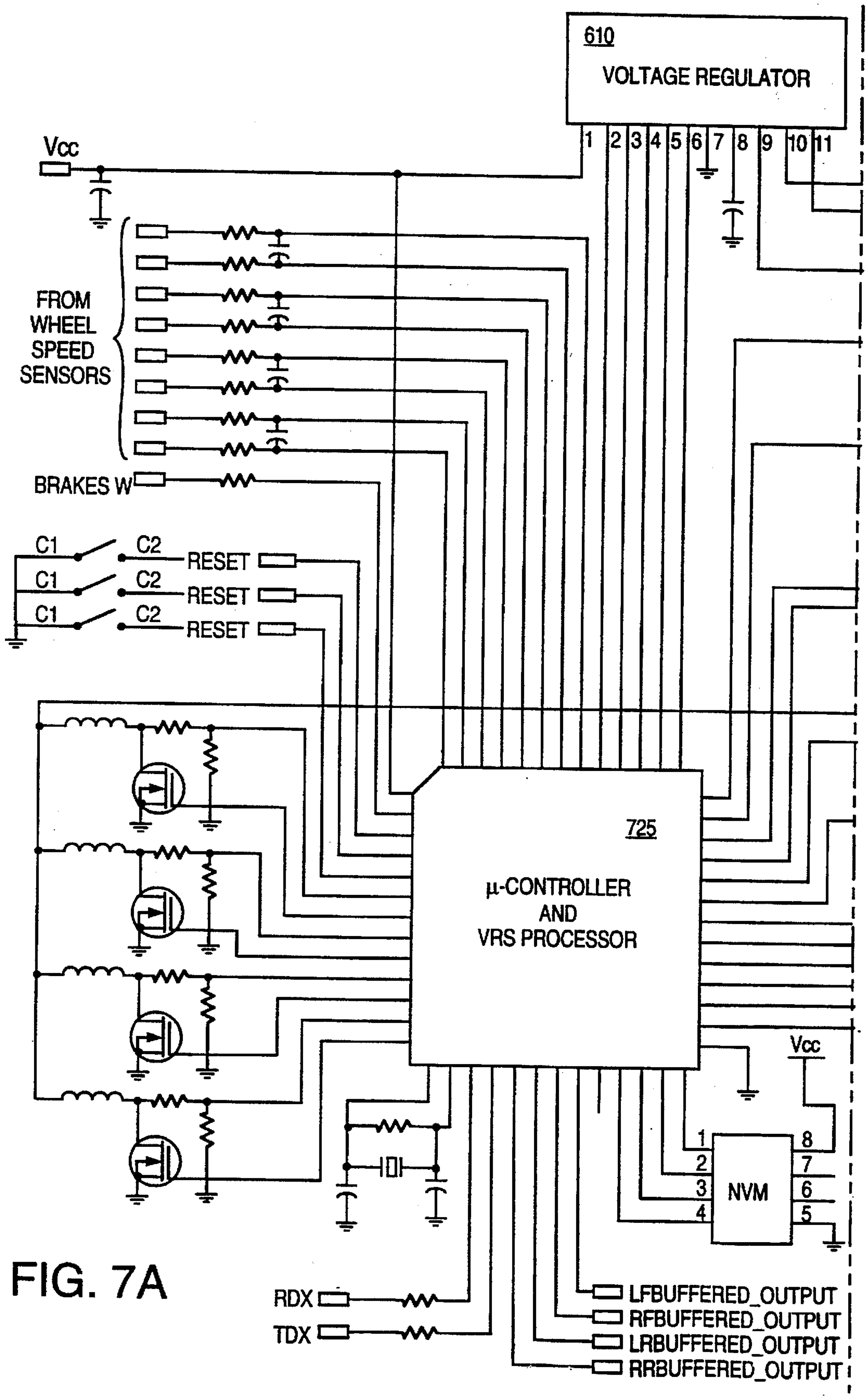
Figures 7, 7B:
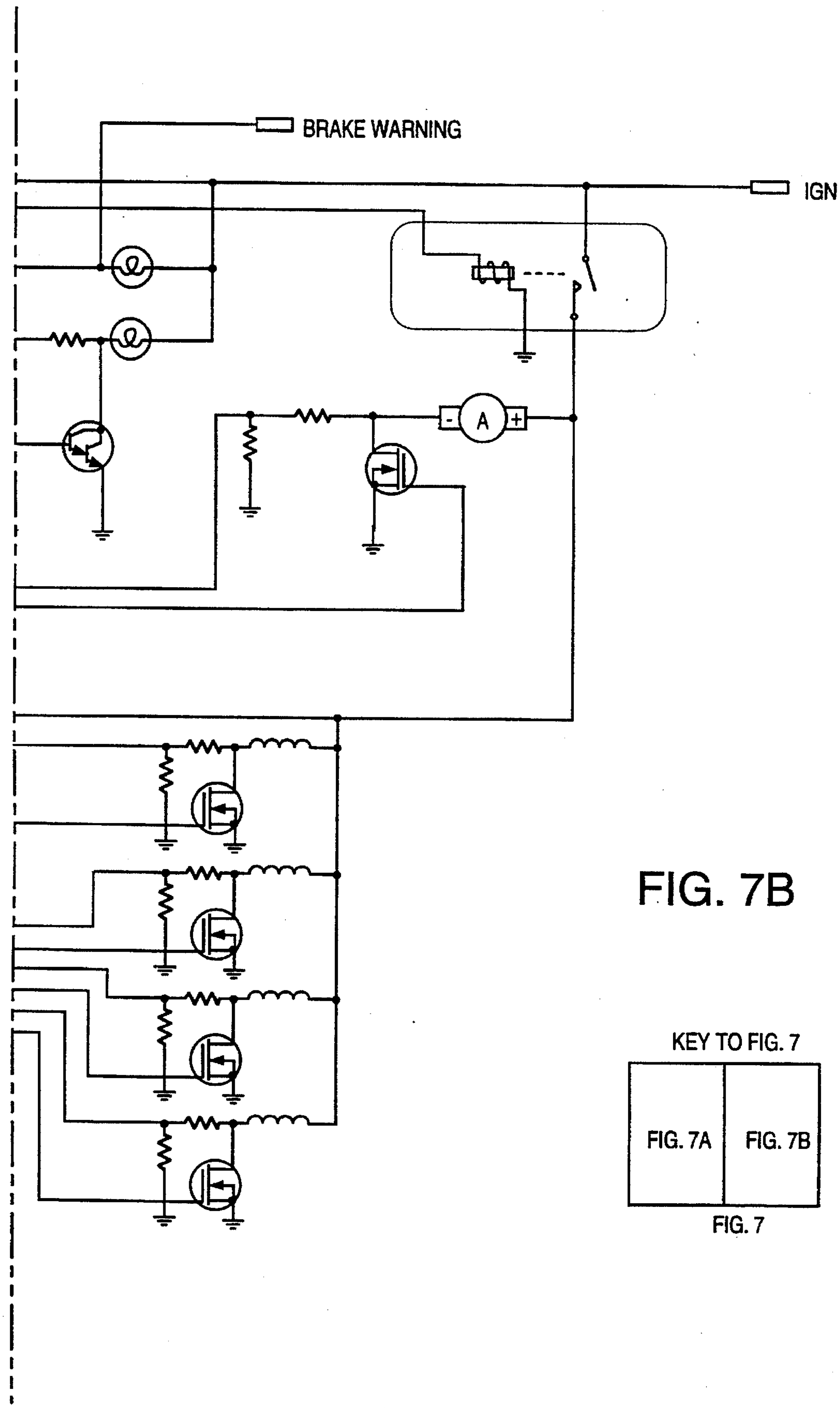

FIG. 7 shows an embodiment in accordance with the present invention in which the functions of microcontroller 220 and VRS-processor 230 are incorporated on a single 52-pin multi-chip package 725.

Figure 8A:
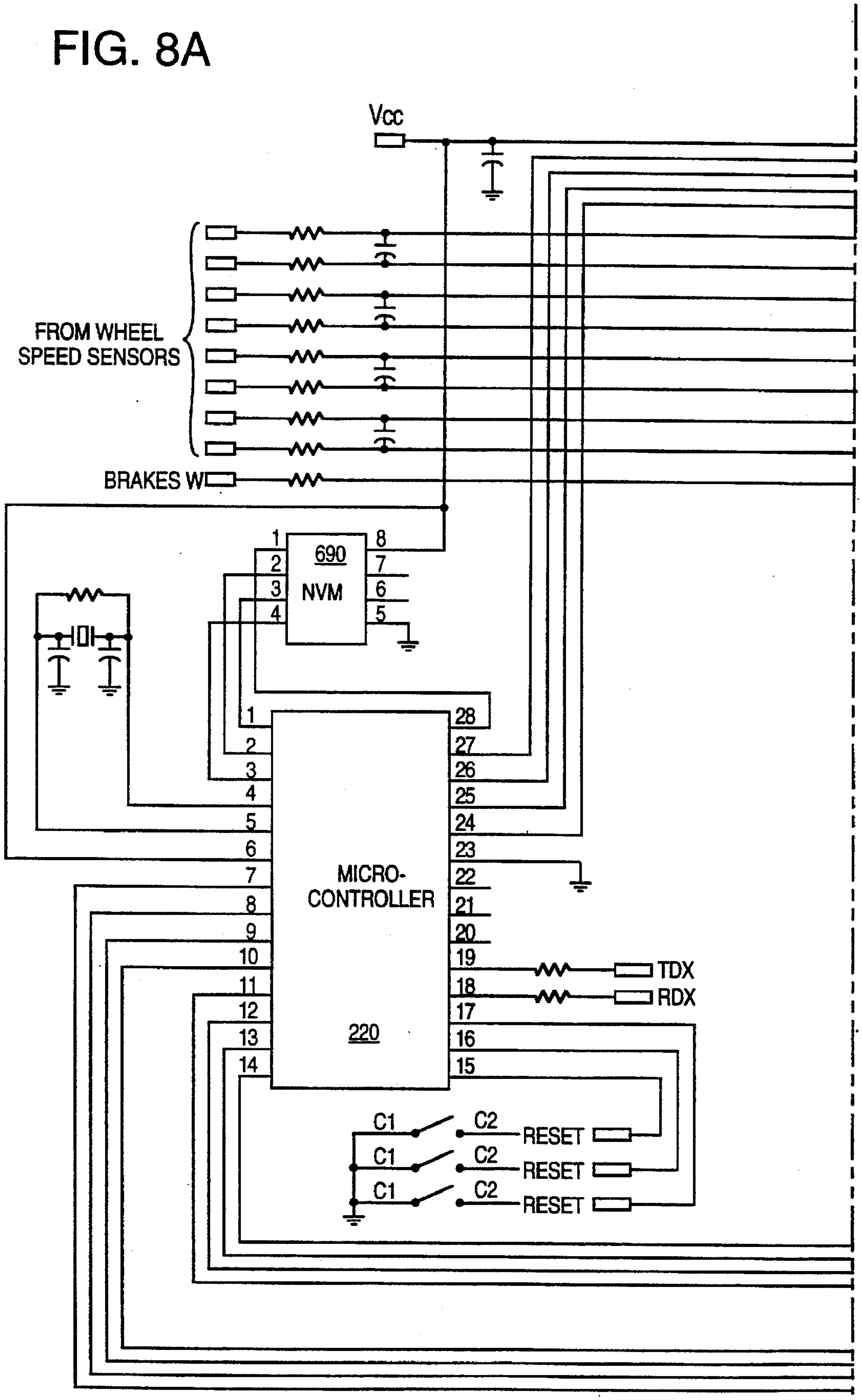
Figure 8B:
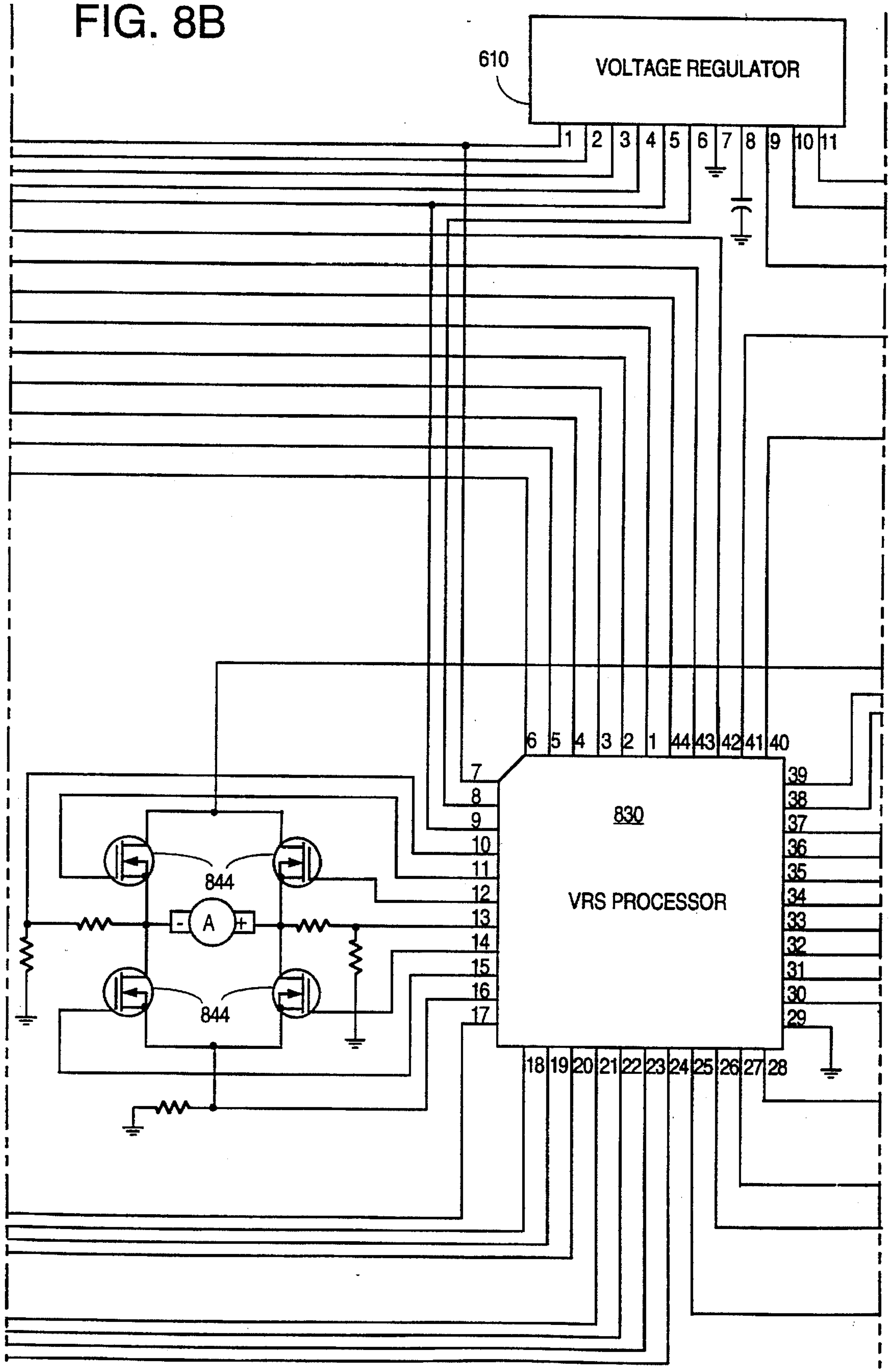
Figures 8, 8C:
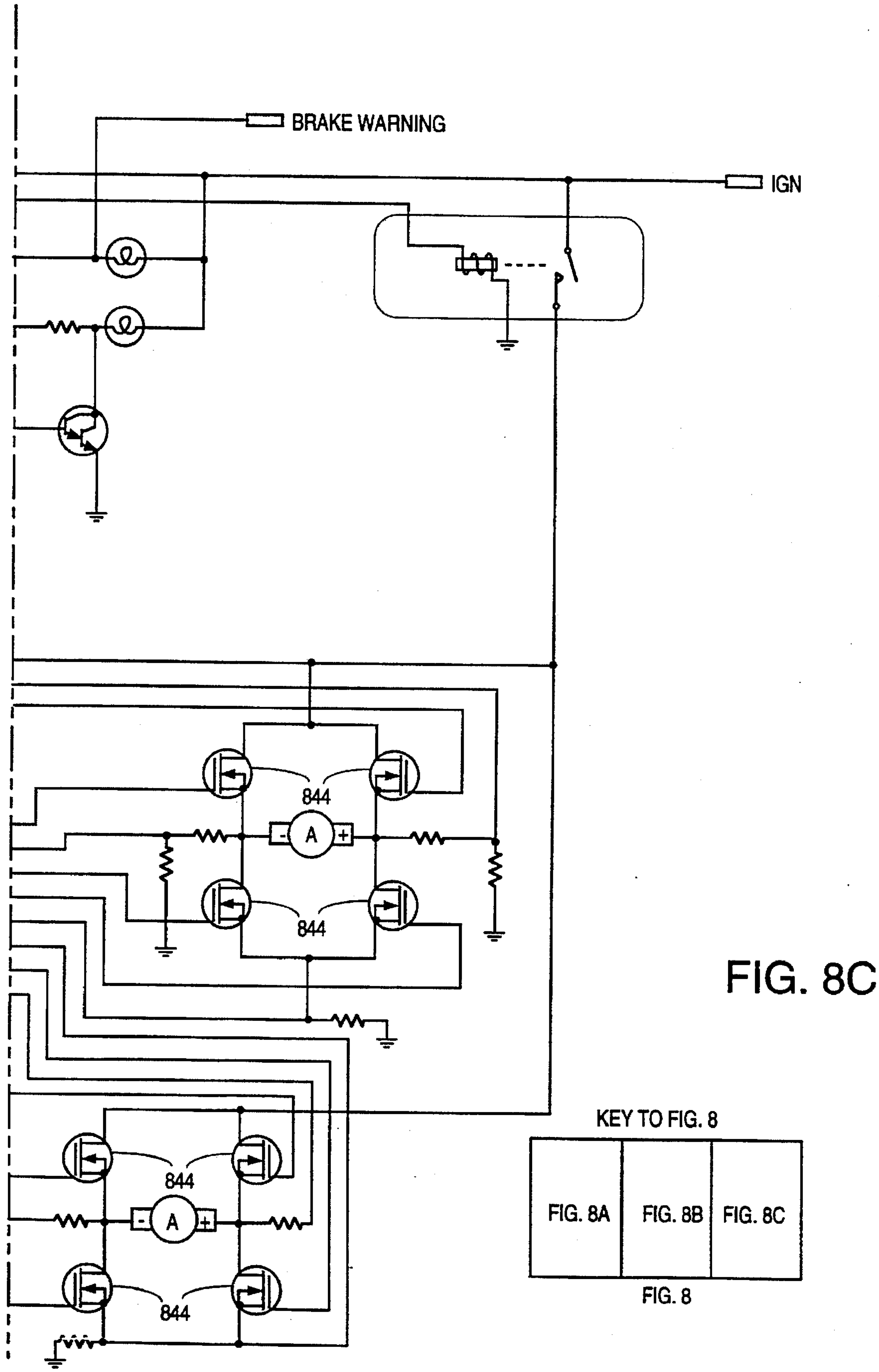

FIG. 8 shows an embodiment in accordance with the present invention which differs from the embodiment of FIG. 6 in that discrete transistors 284 and 286 which control solenoid valves 244 and pump motor 246 in FIG. 6 are replaced in FIG. 8 with an alternative configuration of discrete transistors 844. Transistors 844 provide independent control of the two front wheels but control the two back wheels as a single unit. Control of transistors 844 requires twelve pins instead of the nine used to control transistors 284 and 286 in the embodiment of FIG. 6. Accordingly, the three pins used to connect VRS-processor 230 to NVM 690 in FIG. 6 are used for connections to transistors 844 in FIG. 8. VRS-processor 230 can therefore write failure codes to NVM 690 through microcontroller 220.

Figure 9A:
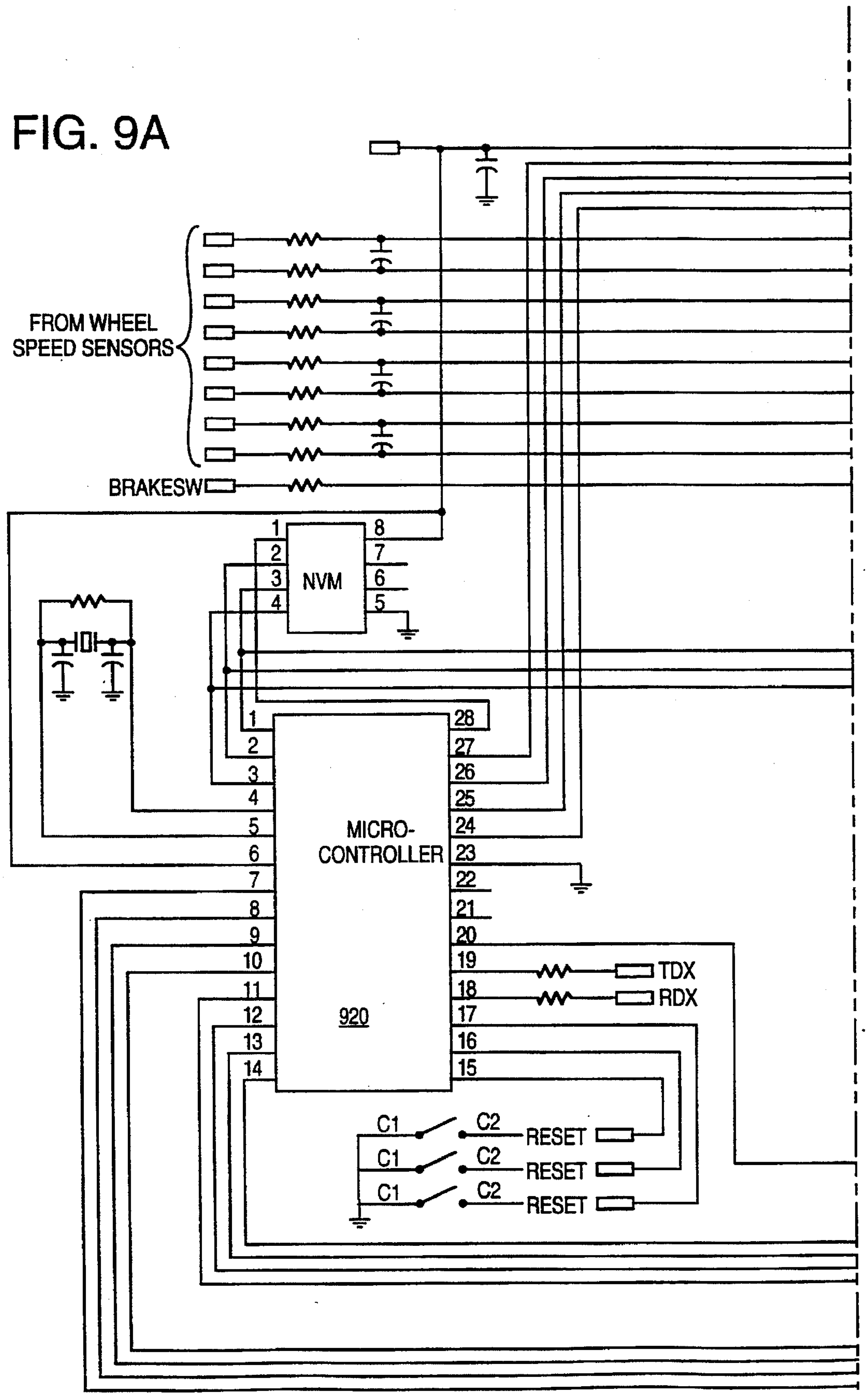
Figure 9B:
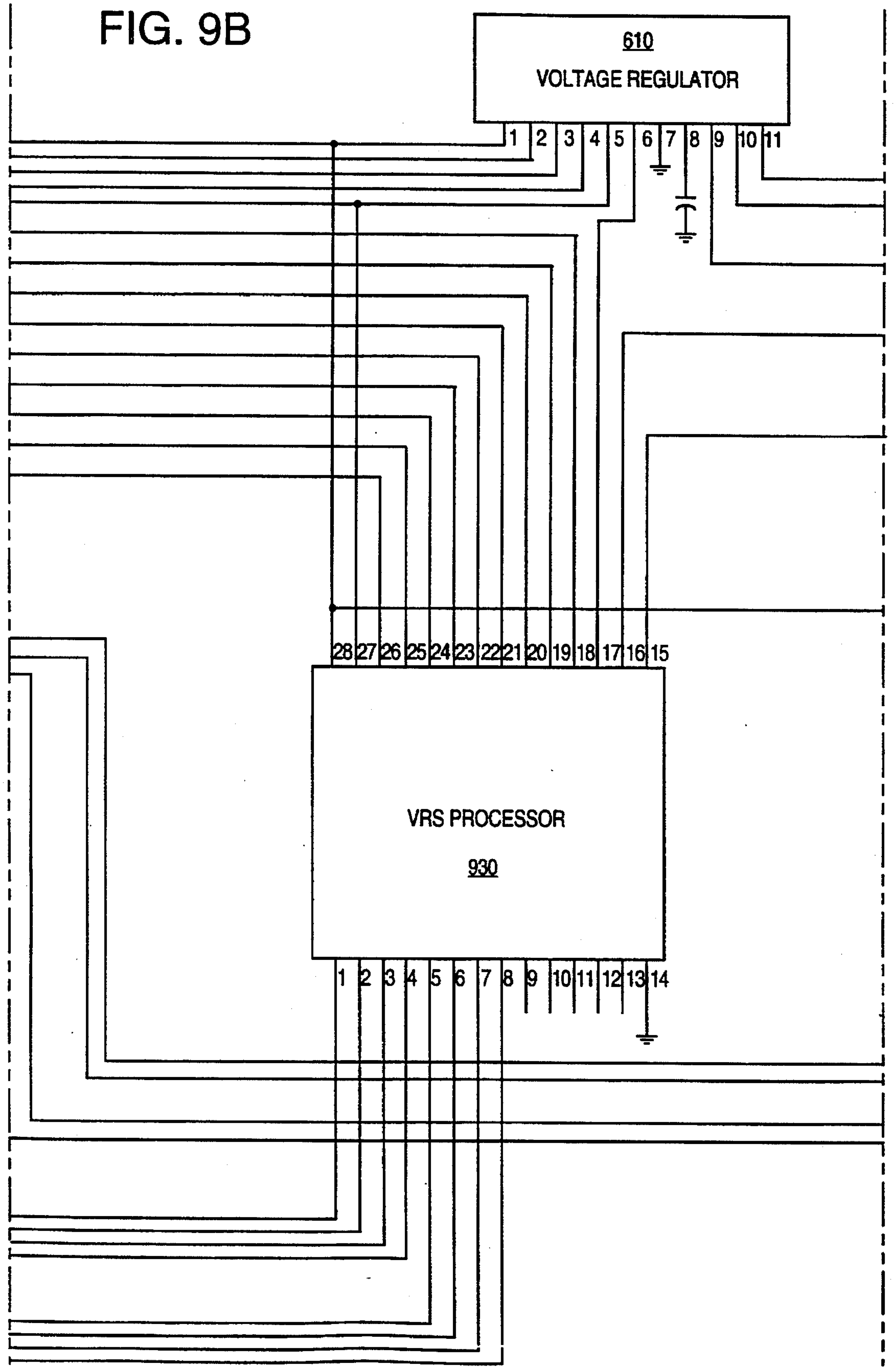
Figure 9C:
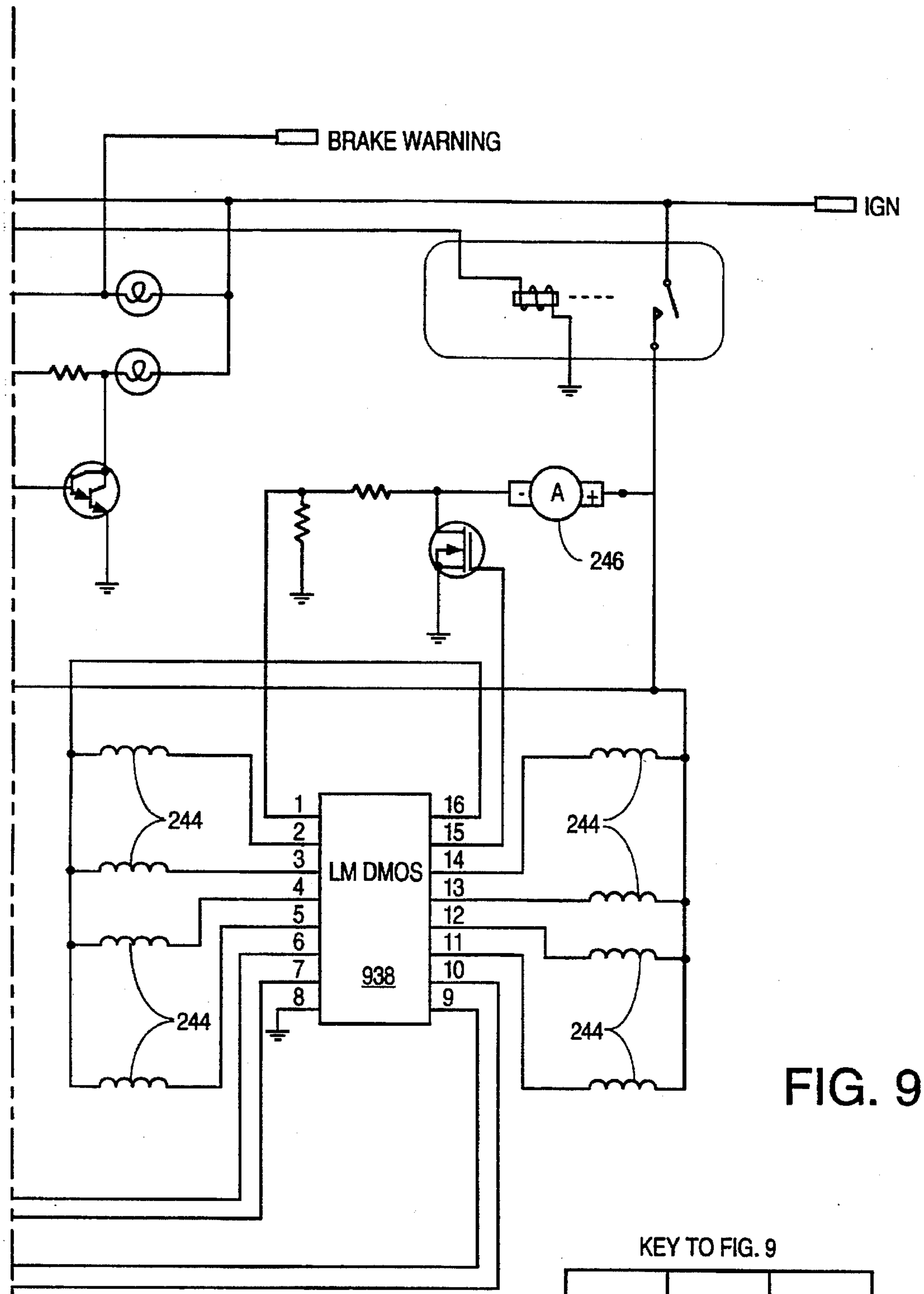
Figure 9:
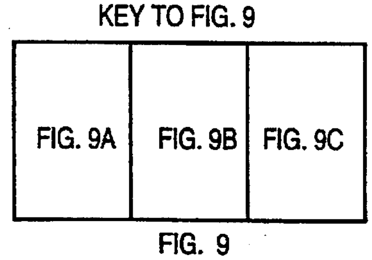

FIG. 9 shows an anti-lock braking system in accordance with the present invention that differs from the above described embodiments in that VRS-processor 930 does not contain a FET driver or feedback sensor circuit. Rather, a separate "smart power" integrated circuit 938 controls all of the solenoid valves 244 and pump motor 246. Smart power integrated circuit 938 is typically an LM DMOS driver. Smart power integrated circuit 938 can save assembly and inventory cost of a system which uses discrete transistors because a single integrated circuit 938 rather that several discrete FETs are mounted on a vehicle. Microcontroller 920 communicates directly with integrated circuit 938.

Tables 1–4 below shows a failure mode effects analysis (FMEA) of many possible malfunctions in an anti-lock braking system and indicates how each malfunction would typically be controlled.

TABLE 1

Anti-Lock Braking System
Failure Mode Effects Analysis

| Part function | Potential failure | Anti-lock braking system Control Technique |
|---|---|---|
| Wheel Sensor Inputs | Short to ground. Short to battery voltage IGN. Open. | VRS-processor hardware controls inputs and periodically transmits status signals to microcontroller which analyzes status signals and makes software decision based on software-FMEA strategy. |
| Battery Voltage Input (IGN) | Battery Voltage missing. Battery Voltage out of range. | The voltage regulator hardware senses if battery voltage is out of voltage range and if so disables the safety relay, activates the lamp, asserts a RESET signal, and asserts a fault signal, putting the system in shutdown mode. |
| Relay driver output | Load shorted. Load open. | The voltage regulator hardware determines if the driver load is open or shorted and if so disables the safety relay, activates the lamp, asserts a RESET signal, and asserts a fault signal putting the system in shutdown mode. VRS-processor software switches on warning lamp, and turns off discrete transistors if the safety relay is always open or always closed. |
| Lamp driver output | Load shorted. Load open. | The voltage regulator hardware senses if the driver load is open or shorted and if so asserts a fault signal. Software FMEA decides on further actions. |
| Brake Pedal Input | Short to ground. Short to IGN. Open. | VRS-processor software senses the brake pedal input signal and periodically transmits status signals to the microcontroller. Software decides on further actions. |
| A/D inputs | Short to ground. Short to IGN. Open. | VRS-processor monitors inputs and periodically transmits status signals to the microcontroller. Software decides on further actions. |
| Valve driver outputs | Short to ground. Short to IGN. Open. | Output driver (typically in VRS-processor) senses if loads are open/short. Status signals are periodically transmitted to the microcontroller. Software decides on further actions if errors are detected. |
| Motor relay driver output | Load shorted. Load open. | Output Driver (typically in VRS-processor) senses if the load is open/short. Input status signals are transmitted periodically to the microcontroller. Software decides on further actions if an error is detected. If an error is detected VRS-processor software switches on the warning lamp, and disables anti-lock braking system function. |

TABLE 1-continued

Anti-Lock Braking System
Failure Mode Effects Analysis

| Part function | Potential failure | Anti-lock braking system Control Technique |
|---|---|---|
| RxD input | Short to ground. Short to IGN. Open. | Microcontroller software controls short detection and decides on further actions if an error is detected. |
| TxD output | Short to ground. Short to IGN. Open. | Microcontroller software controls short detection and decides on further actions if an error is detected. |

TABLE 2

Voltage Regulator Integrated Circuit
Failure Mode Effects Analysis

| Part function | Potential failure | Current Control |
|---|---|---|
| Vcc 5 V output VOUT terminal | Vcc is low. | Hardware snaps off Vcc if voltage is low. Detection will also disable main relay, activate lamp, assert RESET signal, and assert fault signal. System will be in shutdown mode. |
| Battery Voltage input (IGN) | Battery Voltage missing or out of range. Battery polarity reversed. | Hardware sensing of battery voltage that is out of range will disable the main relay, activate the lamp, assert a RESET signal, and assert a fault signal putting the system in shutdown mode. |
| RELAY driver output | Load shorted. Load open. | Hardware senses if driver load is open/short and if so, disables the main relay, activates the lamp, asserts a RESET signal, and asserts a fault signal putting the system in shutdown mode. |
| LAMP driver output | Load shorted. Load open. | Hardware senses if the driver load is open/short and if so, asserts a fault signal and deactivates lamp driver output. Microcontroller software decides on further actions. |
| LAMP/RELAY FAULT output | Short to ground. Short to Vcc. Open. | No Hardware detection implemented. Status of output signal is checked by microcontroller software which decides on further actions. |
| RESET output | Short to ground. Short to Vcc. Open. | No Hardware detection implemented. Reset output is directly provided to VRS-processor and microcontroller. |
| RESET DELAY input | Short to ground. Short to Vcc. Open. | If reset delay input is Vcc or open, the reset signal pulse width is not extended. If reset delay input low reset signal is asserted (LOW). |
| GND input | Short to VCC. Short to IGN. Open. | No Hardware detection implemented. |
| LON terminal (input) | Short to ground. Short to Vcc. Open. | No Hardware detection implemented. The lamp on signal directly enables/disables the lamp driver output if an inhibit is not asserted. If the LON terminal is open, the lamp driver turns on the lamp. |

TABLE 2-continued

| Voltage Regulator Integrated Circuit Failure Mode Effects Analysis | | |
|---|---|---|
| Part function | Potential failure | Current Control |
| ROFF terminal (input) | Short to ground. Short to Vcc. Open. | No Hardware detection implemented. Signal directly enables/disables the relay driver output if an inhibit signal is not asserted. If the ROFF terminal is open, the driver does not supply current to the relay. |
| INHIBIT input | Short to ground. Short to Vcc. Open. | No Hardware detection implemented. Inhibit signal input active high. Asserted inhibit signal disables the main relay, activates the lamp, asserts a RESET signal, and asserts a fault signal, putting the system in shutdown mode. Inhibit input being low directly relates to the output driver signals, ROFF and LON. If the INHIBIT terminal is open, the lamp driver turns on the lamp and the relay driver does not supply current to the relay. |

TABLE 3

| VRS-Peripheral Failure Mode Effects Analysis | | |
|---|---|---|
| Part function | Potential failure | Current Control |
| Vcc 5 V input | Vcc input is low. | VRS-processor will not operate. Voltage regulator controls system. |
| GND input | GND input is Vcc. | VRS-processor will not operate. Voltage regulator controls system (shutdown mode). |
| RESET input | Short to ground. Short to Vcc. Open. | No Hardware detection implemented. If shorted to ground, the voltage regulator puts system in shutdown mode. |
| Buffered output Terminals | Short to ground. Short to Vcc. Open. | Microcontroller software can periodically calculate a velocity from buffered output signals to check accuracy of VRS-processor. If an error is detected, software decides on further action. |
| HSsync HSin HSsync HSout HSsync HShs1 HSsync HShs2 | Short to ground. Short to Vcc. Open. | No Hardware detection implemented. VRS-processor software detects male function errors. On error software decides on further actions. |
| Wheel Speed Sensor inputs 1a, 1b, 2a, 2b, 3a, 3b, 4a, and 4b. | Short to ground. Short to Vcc. Open. | Hardware control of inputs. Input status signals transmitted periodically to microcontroller which analyzes faults and makes software decision. |
| A/D channel 1 A/D channel 2 A/D channel 3 A/D channel 4 | Short to ground. Short to Vcc. Open. | Software control inputs and sends input status signals to microcontroller. Software decides on further actions. |

TABLE 3-continued

| VRS-Peripheral Failure Mode Effects Analysis | | |
|---|---|---|
| Part function | Potential failure | Current Control |
| SYSTEM CLOCK input | Missing clock signal. Short to ground or to Vcc. Open. | Hardware detection is implemented. If the system clock input is missing, the back-up oscillator takes over and continues operation of the VRS-processor which generates an inhibit signal to the Voltage Regulator and shuts down the system. |
| Input/Output lines | Short to ground. Short to Vcc. Open. | Hardware/Software controls inputs. Input status signals are transmitted periodically to microcontroller which analyzes faults and makes Software decision. |

TABLE 4

| Microcontroller Failure Mode Effects Analysis | | |
|---|---|---|
| Part function | Potential failure | Current Control |
| Vcc 5 V input | Vcc Input is too low. | Microcontroller will not operate. Voltage regulator puts system in shutdown mode. |
| GND input | GND input is Vcc or open. | Microcontroller will not operate. Voltage regulator puts system in shutdown mode. |
| RESET input | Short to ground or to Vcc. Open. | No Hardware detection implemented. If shorted to ground, Voltage Regulator puts system in shutdown mode. |
| HSsync HSin HSsync HSout HSsync HShs1 HSsync HShs2 | Short to ground or to Vcc. Open. | No Hardware detection implemented. Software detects male function on both parts VRS-processor and on microcontroller. If an error is detected, software decides on further actions. |
| Buffer Input Terminals | Short to ground or to Vcc. Open. | The VRS-processor transmits wheel sensor signals to the microcontroller. Microcontroller software is able to cross check the integrity of sensor signals and if an error is detected, decide on further actions. |
| System clock CK1 CK0 | Short to ground or to Vcc. Open. | If clock fails, the microcontroller no longer functions. In this case, the VRS-processor takes over control and disables the system by asserting signal inhibit. Software decides on further actions. |
| Watchdog output | Short to ground or to Vcc. Open. | If watchdog output is low, the Reset line will be pulled low so that the microcontroller no longer operates. In this case, the VRS-processor will take over control and disable the system using the Voltage Regulator input signal inhibit. |
| RxD input | Short to ground or to IGN. Open. | Microcontroller software controls short detection. Software decides on further |

TABLE 4-continued

| Microcontroller Failure Mode Effects Analysis | | |
|---|---|---|
| Part function | Potential failure | Current Control |
| | | actions if error detected. |
| TxD output | Short to ground or to IGN. Open. | Microcontroller software controls short detection. Software decides on further actions if error detected. |
| Input/Output lines | Short to ground or to Vcc. Open. | Hardware and software control of inputs. Input status signals transmitted periodically to microcontroller which analyzes faults and makes decision based on software strategy. |

VOLTAGE REGULATOR INTEGRATED CIRCUIT

FIGS. 3A, 3B, and 3C are a circuit diagram of a voltage regulator integrated circuit 210 in accordance with the present invention. The voltage regulator integrated circuit 210 receives an input voltage (typically in the range of 9–16 volts) on an input terminal VIN and provides a regulated output voltage (typically in the range of 4.5–5.5 volts), on an output terminal VOUT. The output voltage is regulated by a feedback loop comprising a PNP bipolar transistor 301, a voltage divider comprising two resistors 304A, a bandgap reference circuit 305, an amplifier 303, and a NPN bipolar transistor 302. Amplifier 303 controls NPN bipolar transistor 302 to supply the correct amount of current to the base of transistor 301 so that the voltage generated by the voltage divider 304A on the inverting input lead of amplifier 303 will substantially equal the voltage VBG on the non-inverting input lead of amplifier 303.

A thermal shutdown circuit 310 employs a voltage divider including resistors 311 and 312 which biases the base of transistor 313. The collector of transistor 313 is coupled to the base of transistor 302 via a resistor 302A. As the temperature of the integrated circuit rises, the base-emitter voltage $V_{be}$ of transistor 313 of the thermal shutdown circuit 310 decreases, thereby causing transistor 313 to conduct current away from the base of transistor 302. Transistor 302 therefore conducts less current or is turned off and transistor 301 conducts less current or is off.

Overvoltage shutdown circuit 320 employs a zener diode 321 to turn on transistor 323 if the voltage on input terminal VIN exceeds a predetermined voltage. The collector of transistor 323 is coupled to the base of transistor 302 via a resistor 302B. When transistor 323 turns on, transistor 323 conducts current away from the base of transistor 302. Transistor 302 therefore conducts less current or is turned off, and transistor 301 conducts less current or is off.

A comparator 306 and a PNP bipolar transistor 309 function to snap off the output voltage on output terminal VOUT if the voltages on terminals VIN or VOUT drop too low. Terminals VIN and VOUT are connected to the non-inverting input lead of comparator 306 through resistors 307 and 308, respectively. When the voltages on terminals VIN and VOUT cause the voltage on the non-inverting input lead of comparator 306 to be less than the voltage VBG on the inverting input lead of comparator 306, the voltage output by comparator 306 transitions low thereby turning PNP bipolar transistor 309 on and coupling output terminal VOUT to ground potential. The output voltage on output terminal VOUT is therefore said to have been "snapped off".

A voltage monitor circuit 332 compares the output voltage on output terminal VOUT with a high voltage limit VOH and with a low voltage limit VOL. Voltage limits VOH and VOL, which are provided by band gap reference circuit 305, define a desired voltage range of the output voltage on output terminal VOUT. A typical voltage range for the output voltage is between about 5.5 volts and 4.5 volts. If a voltage supplied by resistors 304B from the output voltage on output terminal VOUT either is greater than the voltage VOH or is less than the voltage VOL, then voltage monitor circuit 332 asserts the signal VOUT NOT IN REGULATION high. Inverter 333 provides the signal OVERTEMP which is high if thermal shutdown circuit 310 has disabled the output voltage regulation of transistor 301. Inverter 334 provides the signal OVERVOLTAGE which is high if overvoltage shutdown circuit 320 has disabled the output voltage regulation of transistor 301. OR gate 331 provides an output signal that is high if any of the three signals VOUT NOT IN REGULATION, OVERVOLTAGE, or OVERTEMP is high.

A reset circuit 340 asserts an active low reset signal by pulling the voltage on terminal $\overline{\text{RESETOUT}}$ low if OR gate 331 outputs a high logic signal. When the voltage output by OR gate 331 goes high, transistor 342 turns on and terminal $\overline{\text{RESETOUT}}$ is coupled to ground. The reset signal on terminal $\overline{\text{RESETOUT}}$ is thereby asserted low. Because the base of transistor 344 is also coupled to the output lead of OR gate 331, transistor 344 is also turned on. Current supplied from current source 343 is therefore coupled to ground potential and does not charge an external capacitor 345. If a charge existed on external capacitor 345 prior to transistor 344 being turned on, then that charge is relatively rapidly discharged to ground through now conductive transistor 344. When the signal output from OR gate 331 transitions from high to low at the end of a resetting condition, the $\overline{\text{RESETOUT}}$ terminal continues being driven with a low logic level because now discharged external capacitor 345 causes the voltage on the inverting input lead of comparator 341 to be less than the voltage VBG on the inverting input lead of comparator 341. As a result, comparator 341 outputs a high digital logic level and causes transistor 342 to remain conductive. With transistor 344 turned off, current from current source 343 eventually charges external capacitor 345 so that the voltage on the inverting input lead of comparator 341 eventually exceeds the voltage VBG. Comparator 341 then drives the voltage on the base of transistor 342 low and turns transistor 342 off. With transistor 342 turned off, the voltage on terminal $\overline{\text{RESETOUT}}$ is pulled up to the output voltage on terminal VOUT by a pull-up resistor 342A. The minimum reset period is therefore determined by the magnitude of the current sourced by current source 343 and by the capacitance of external capacitor 345. Current source 343 may provide a small current such as 10 μA. Alternatively, a resistor may be employed in place of current source 343.

The voltage regulator integrated circuit of FIG. 3 also includes a device driver circuit for sourcing current from terminal RELAY to an external device. In the anti-lock braking system of FIGS. 2A and 25, terminal RELAY is coupled to an external safety relay 242 which is on when current is flowing through the relay and which is off when current is not flowing through the relay. However, voltage regulator integrated circuits in accordance with the invention are not limited to anti-lock braking system applications but may be used in any application requiring a regulated supply voltage and the sourcing (or alternatively sinking) of current for an external device.

PNP transistor 350 couples output terminal RELAY to input terminal VIN when a low voltage is applied to the base of transistor 350. Transistor 350 is also connected to a sensor circuit including a resistor $R_{SENSE}$ 351 and a current monitor circuit 352. Current monitor circuit 352 compares a voltage dropped across resistor $R_{SENSE}$ 351 (which is indicative of the current flowing out of terminal RELAY) with two reference voltages IRH and IRL. Reference voltage IRH corresponds with a maximum amount of current that should be flowing out of terminal RELAY during normal operation when the relay is on whereas reference voltage IRL corresponds with a minimum amount of current that should be flowing out of terminal RELAY during normal operation when the relay is on. If current monitor circuit 352 determines that the current flowing through terminal RELAY is larger than IRH (indicating, for example, that an attached device is shorted) or is smaller than IRL (indicating, for example, that an attached device is open), then current monitor circuit 352 asserts a signal RELAY FAULT to a high digital logic level. If a relay fault is indicated by a high logic level of the signal RELAY FAULT, and if the base of transistor 350 is being driven low indicating that current should be flowing from terminal RELAY, then the voltage output of an AND gate 379 causes the voltage output from a NOR gate 370 to go to a low digital logic level.

A similar device driver is connected to output terminal LAMP. In the anti-lock braking system of FIGS. 2A and 2B, output terminal LAMP is coupled to warning indicator 252 such as a warning light bulb on a dashboard of an automobile. NPN transistor 360 couples output terminal LAMP to ground when the voltage on the base of transistor 360 is high. When an operable external device such as a bulb is connected to output terminal LAMP, current flows into output terminal LAMP. A current monitor 362 compares the voltage across a resistor $R_{SENSE}$ 361 with two reference voltages ILL and ILH. Voltage ILL corresponds with a voltage dropped across resistor $R_{SENSE}$ 361 when a minimum amount of current is flowing into output terminal LAMP when the lamp should be on. Voltage ILH corresponds with a voltage dropped across resistor $R_{SENSE}$ when a maximum amount of current is flowing into output terminal LAMP when the lamp should be on. If the current flowing into output terminal LAMP is larger than the current corresponding with voltage ILH (indicating, for example, that an attached device is shorted) or is smaller than the voltage corresponding with voltage ILL (indicating, for example, that an attached device is open), then current monitor circuit 362 asserts a signal LAMP FAULT high. If a fault is indicated by a high logic level of the signal LAMP FAULT, and if the base of transistor 360 is being driven high indicating that current should be flowing into output terminal LAMP, then the high voltage output of an AND gate 369 causes the output of NOR gate 370 to go to a low digital logic level.

When power is initially applied to the voltage regulator integrated circuit, an external capacitor 373 attached to terminal $\overline{\text{LAMPINRUSH}}$ is typically in a discharged state. The voltage on the inverting input lead of a comparator 371 is therefore less than the voltage VBG on the non-inverting input lead and comparator 371 causes the voltage on the clock inputs of flip-flops 374 and 375 to transition from low to high. However, rather than clocking in the high digital logic levels present on the respective D inputs of flip-flops 374 and 375, asynchronous clear inputs of flip-flops 374 and 375 are held low by the signals output by RC network 377A and AND gate 377 and RC network 378A and AND gate 378, respectively. After an initial power on reset period set by the capacitances and resistances of the RC networks, the low voltage logic levels are removed from the clear inputs of the flip-flops. The flip-flops then remain cleared because the voltage on the clock inputs of the flip-flops remain high and do not transition. Accordingly, an OR gate 376 outputs a digital logic level low onto output terminal LAMP/RELAY FAULT during and after the power on reset period.

Assuming that the voltage on terminal ROFF is initially high indicating that the relay driver is turned off, and assuming that the voltage on terminal LON is initially low indicating that the lamp driver is not turned on such that NOR gate 370 outputs a digital logic high, then external capacitor 373 is charged through resistor 372 and terminal $\overline{\text{LAMPINRUSH}}$. When external capacitor 373 charges adequately, comparator 371 causes the signal FAULT to transition from high to low. Because flip-flops 374 and 375 are rising edge triggered, the data outputs of flip-flops 374 and 375 remain low and the voltage on terminal LAMP/RELAY FAULT remains low indicating a no fault condition.

If after external capacitor 373 is charged, the lamp driver were to be turned on by an external device (such as microcontroller 220) driving a digital logic high onto terminal LON, then OR gate 383 would turn transistor 360 on to sink current (for example, through a bulb) into terminal LAMP. A normally functioning bulb, however, has an initially low resistance while the filament is heating. The maximum lamp current ILH may therefore be exceeded causing AND gate 369 to output a digital logic high and causing NOR gate 370 to output a digital logic low. If external capacitor 373 were not present, then the high to low transition on the inverting input lead of comparator 371 would cause a low to high transition on the clock input leads of flip-flops 374 and 375, thereby clocking the flip-flops and causing a digital high to be output from terminal LAMP/RELAY FAULT. External capacitor 373, on the other hand, operates to maintain the voltage on the inverting input of comparator 371 above the voltage VBG on the non-inverting input lead for a period of time adequate for the filament of the bulb to heat and for the current into terminal LAMP to fall below the maximum current ILH. Accordingly, under a no fault condition, NOR gate 370 will switch to output a high logic level before external capacitor 373 has been discharged adequately to clock flip-flops 374 and 375. As a result, a false LAMP/RELAY FAULT signal is avoided during the period of the high lamp inrush current immediately after the lamp driver is turned on.

If a fault condition occurs causing the voltage on the terminal LAMP/RELAY FAULT to be a digital logic high, then an OR gate 380 turns the relay driver off via an OR gate 381 and turns the lamp driver on via an OR gate 383. Similarly, if the voltage on terminal $\overline{\text{RESETOUT}}$ is low indicating a reset condition, then OR gate 380 turns the relay driver off and turns the lamp driver on. Similarly, a digital logic high on terminal INHIBIT causes OR gate 380 to turn off the relay driver and to turn on the lamp driver.

Once high, the fault signal on terminal LAMP/RELAY FAULT remains high until both flip-flops 374 and 375 are cleared. When an external circuit such as integrated circuit 220 in FIG. 2A drives the voltage on terminal ROFF high, the output voltage of AND gate 377 goes low and flip-flop 374 is cleared. Similarly, when an external circuit drives the voltage on terminal LON low, the output voltage of AND gate 378 goes low and flip-flop 375 is cleared. An on-chip pull-up resistor 382 causes the default state of transistor 350 (and the device driver coupled to output terminal RELAY) to be off. An external circuit, such as microcontroller 220 of FIG. 2, can enable power on output terminal RELAY by pulling the voltage on terminal ROFF low against pullup resistor 382. Similarly, an on-chip pull-up resistor 384 causes the default state of transistor 360 (and the device driver circuit coupled to terminal LAMP) to be on. An external circuit, such as microcontroller 220 of FIG. 2, can turn on transistor 360 by driving the voltage on terminal 384 high. Broken signal conductors to terminals ROFF and LON outside the voltage regulator integrated circuit 210 will therefore typically be detectable, will typically cause the anti-lock braking system to be disabled by turning the safety relay 242 off, and will typically cause a dashboard warning indicator bulb 252 to be lighted.

In the anti-lock braking system of FIGS. 2A, and 2B, the anti-lock braking system is safely shut down when the safety relay 242 is off (transistor 350 is off) and when the warning indicator 252 is on (transistor 360 is on). A shutdown mode of the voltage regulator integrated circuit forces transistor 350 off and transistor 360 on. The $\overline{\text{INHIBIT}}$ input terminal to the voltage regulator integrated circuit is provided to allow an external device to disable a relay coupled to the relay driver and to turn on a warning indicator coupled to the lamp driver. If the $\overline{\text{INHIBIT}}$ input terminal is not pulled low by an external device, then an internal pull-up resistor 380A will pull a voltage on an input lead of OR gate 380 high preventing current from being sourced from output terminal RELAY and causing output terminal LAMP to attempt to sink current. Accordingly, if the VRS-processor 230 of FIG. 2B is not attached to input terminal $\overline{\text{INHIBIT}}$ or for some reason does not drive the voltage on terminal $\overline{\text{INHIBIT}}$ low, then the voltage regulator integrated circuit goes into shutdown mode. In some embodiments of the present invention, a $\overline{\text{LAMPINRUSH}}$ terminal is not provided. Rather, an initial inrush of current into output terminal LAMP causes a LAMP/RELAY FAULT signal to be asserted but software executing in the microcontroller 220 ignores the LAMP/RELAY FAULT signal for an appropriate period of time after turning on the lamp driver.

BACK-UP OSCILLATOR CIRCUIT

Figure 5:
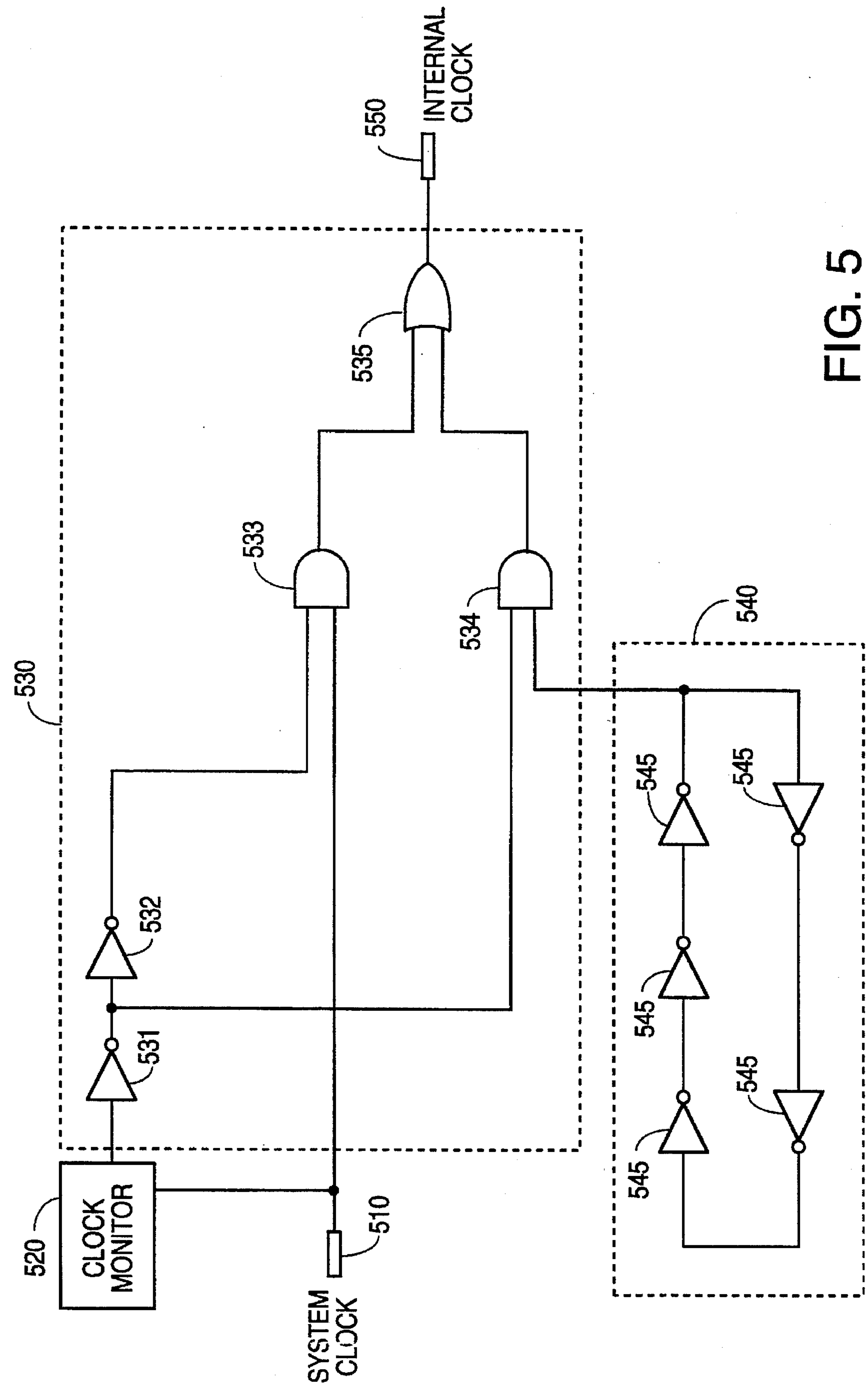
FIG. 5 is a block diagram of back-up oscillator circuit in accordance with an embodiment of the present invention.

FIG. 5 is a gate level diagram of a back-up oscillator circuit that may be employed in an integrated circuit such as integrated circuit 230 of FIG. 2B. Most integrated circuits that require a clock signal use an external timing element such as a quartz crystal, an RC network, or a ceramic resonator because oscillators that can be formed entirely on an integrated circuit chip with standard integrated circuit technology do not have the required stability and/or temperature independence for ordinary operation of most digital logic circuitry. However, in accordance with the present invention, a back-up oscillator implemented entirely on an integrated circuit is sufficient for use when a primary oscillator fails. In the case where the integrated circuit containing the back-up oscillator is a microcontroller such as integrated circuit 230 in an anti-lock braking system, processing circuitry of the microcontroller uses the signal from the back-up oscillator for execution of a shutdown routine that safely shuts down the anti-lock braking system.

The back-up oscillator circuit of FIG. 5, includes a back-up oscillator 540, a terminal 510 for receiving a clock signal from a primary oscillator, a clock monitor circuit 520 which determines if the signal received on terminal 510 is an adequate clock signal, and a multiplexer 530 to provide on output terminal 550 either a signal derived from terminal 510 or a signal derived from back-up oscillator 540. Back-up oscillator 540 in FIG. 5 is a ring oscillator which includes an odd number of inverters 545 connected in a ring and is implemented entirely on the integrated circuit. The frequency of a ring oscillator depends on the propagation time around the ring which in turn depends on such factors as the number of inverters, the structure of the inverters, and the temperature of the circuit. The invention is not limited to ring oscillators but may employ any type of oscillator or clock circuit that can be fabricated in an integrated circuit. For example, a Wien bridge oscillator may be employed as a back-up oscillator in place of ring oscillator 540. Additionally, an oscillator that employs external elements may also be used as a back-up oscillator.

Multiplexer 530 selects either a signal from terminal 510 or from back-up oscillator 540 for coupling onto terminal 550 according to whether a signal from clock monitor 520 is high or low. There are many well known ways to implement a multiplexer. FIG. 5 shows one example of a multiplexer implemented using logic gates such as inverters 531 and 532, AND gates 533 and 534, and OR gate 535.

Clock monitor circuit 520 monitors the signal present on terminal 510 and determines if the frequency of the signal falls within a desired operating range of frequency and peak voltage. The desired operating frequency range may include an upper and a lower limit for the frequency or just a lower limit. Clock monitor circuits are well known in the art and typically employ resistors and capacitors connected in RC circuit.

Although the present invention has been described with reference to particular embodiments for illustrative purposes, the present invention is not limited thereto. A voltage regulator integrated circuit employing a voltage regulator, a first device driver and a second device driver all interconnected on the same integrated circuit chip need not be used to control a lamp indicator and a relay and need not be used in an anti-lock braking system. The voltage regulator integrated circuit of the present invention is useful in other applications where the detection of failures and/or the warning of failures are required for fail-safe operation. Voltage regulators, relay drivers and/or lamp drivers having fault detection features different from the fault detection features of the voltage regulator, relay driver and lamp driver of the illustrated specific embodiment may be employed. Although the back-up oscillator of the present invention is described in connection with a wheel speed sensor conditioning integrated circuit in an anti-lock braking system, a back-up oscillator may be provided in other types of integrated circuits where an external timing element such as a crystal or where a primary oscillator external to the integrated circuit ordinarily provides a clock signal to the integrated circuit. Although a nonredundant anti-lock braking system employing three dissimilar integrated circuit chips is disclosed, a nonredundant or a redundant anti-lock braking system can be partitioned in other ways into other dissimilar integrated circuit chips in accordance with aspects of the present invention. Accordingly, various modifications, adaptations, substitutions and combinations of different features of the specific embodiments can be practiced without departing from the scope of the invention set forth in the appended claims.

We claim:

1. An integrated circuit having a first input terminal, a second input terminal, a third input terminal, a first output terminal, a second output terminal, and a third output terminal, comprising:

a voltage regulator coupled to the first input terminal and coupled to the first output terminal, the voltage regulator providing on the first output terminal an output voltage within a second predetermined voltage range if an input voltage on the first input terminal is within a first predetermined voltage range;

a device driver coupled to the second input terminal and to the second output terminal, wherein placing a digital logic level on the second input terminal prevents current flow through the second output terminal; and a warning signal driver which generates a warning signal on the third output terminal if the output voltage is not within the second predetermined voltage range, the warning signal driver being powered by energy from a current flowing into the first input terminal, the third input terminal being capable of carrying a voltage different from a voltage carried on the first output terminal, wherein placing a digital logic level on the third input terminal enables current flow through the third output terminal.

2. The integrated circuit of claim 1, further comprising a voltage monitor circuit and a reset circuit, the voltage monitor circuit monitoring the output voltage of the voltage regulator and causing the reset circuit to output a reset signal on a reset output terminal of the integrated circuit if the output voltage is not within the second predetermined voltage range.

3. The integrated circuit of claim 1, wherein the reset circuit is also coupled to a reset delay terminal of the integrated circuit, a capacitance on said reset delay terminal determining at least in part a minimum period of the reset signal.

4. The integrated circuit of claim 1, wherein the warning signal is a current flowing into the third output terminal.

5. The integrated circuit of claim 1, further comprising a thermal shutdown circuit coupled to the voltage regulator for changing an operation of the voltage regulator if a temperature of the voltage regulator exceeds a predetermined threshold temperature.

6. The integrated circuit of claim 1, further comprising an overvoltage shutdown circuit coupled to the first input terminal, the overvoltage shutdown circuit electrically coupling the first output terminal to a reference potential if the input voltage exceeds a predetermined threshold voltage.

7. The integrated circuit of claim 1, wherein the second predetermined voltage range does not include zero volts.

8. The integrated circuit of claim 7, wherein the second predetermined voltage range is approximately 4.5 volts to approximately 5.5 volts.

9. An integrated circuit having a first input terminal, a second input terminal, a first output terminal, a second output terminal, and a third output terminal, comprising:

a voltage regulator coupled to the first input terminal and coupled to the first output terminal, the voltage regulator providing on the first output terminal an output voltage within a second predetermined voltage range if an input voltage on the first input terminal is within a first predetermined voltage range;

a device driver coupled to the second output terminal and the second input terminal so that placing a digital logic level on the second input terminal prevents current flow through the second output terminal;

a warning signal driver which generates a warning signal on the third output terminal if the output voltage is not within the second predetermined voltage range; and a resistance coupled to the second input terminal such that current flow through the second output terminal is prevented if no circuitry outside the integrated circuit is driving a predetermined voltage onto the second input terminal.

10. An integrated circuit having a first input terminal, a second input terminal, a third input terminal, a first output terminal, a second output terminal, and a third output terminal, comprising:

a voltage regulator coupled to the first input terminal and coupled to the first output terminal, the voltage regulator providing on the first output terminal an output voltage within a second predetermined voltage range if an input voltage on the first input terminal is within a first predetermined voltage range;

a device driver coupled to the second output terminal and the second input terminal so that placing a digital logic level on the second input terminal prevents current flow through the second output terminal;

a warning signal driver which generates a warning signal on the third output terminal if the output voltage is not within the second predetermined voltage range, the third input terminal being coupled to the warning signal driver so that placing a digital logic level on the third input terminal enables current flow through the third output terminal; and a resistance coupled to the third input terminal such that current flow through the third output terminal is enabled if no circuitry outside the integrated circuit is driving a predetermined voltage onto the third input terminal.

11. An integrated circuit having an input terminal, a first output terminal, a second output terminal, and a third output terminal, comprising:

a voltage regulator coupled to the input terminal and coupled to the first output terminal, the voltage regulator providing on the first output terminal an output voltage within a second predetermined voltage range if an input voltage on the input terminal is within a first predetermined voltage range;

a device driver coupled to the second output terminal; and a warning signal driver which generates a warning signal on the third output terminal if the output voltage is not within the second predetermined voltage range; and a snap on/off circuit which monitors the output voltage of the voltage regulator and if the output voltage reaches a first predetermined voltage level the snap on/off circuit couples the first output terminal to a reference potential.

12. An integrated circuit having a first input terminal, a second input terminal, a first output terminal, a second output terminal, and a third output terminal, comprising:

a voltage regulator coupled to the first input terminal and coupled to the first output terminal, the voltage regulator providing on the first output terminal an output voltage within a second predetermined voltage range if an input voltage on the first input terminal is within a first predetermined voltage range;

a device driver coupled to the second output terminal; and a warning signal driver which generates a warning signal on the third output terminal if the output voltage is not within the second predetermined voltage range, wherein the second input terminal is an enable input terminal and wherein placing a digital logic level on the inhibit input terminal prevents current flow through the second output terminal and enables current flow through the third output terminal.

13. An integrated circuit having an input terminal, a first output terminal, a second output terminal, and a third output terminal, comprising:

a voltage regulator coupled to the input terminal and coupled to the first output terminal, the voltage regulator providing on the first output terminal an output voltage within a second predetermined voltage range if an input voltage on the input terminal is within a first predetermined voltage range;

a device driver coupled to the second output terminal; and a warning signal driver which generates a warning signal on the third output terminal if the output voltage is not within the second predetermined voltage range, the warning signal driver being powered by energy from a current flowing into the input terminal, wherein the integrated circuit also has a fault output terminal, the device driver comprising a current monitor circuit and the warning signal driver comprising a current monitor circuit, a fault signal being asserted onto the fault output terminal if the current monitor circuit of the device driver detects an error condition on the second output terminal or if the current monitor circuit of the warning signal driver detects an error condition on the third output terminal.

14. An integrated circuit having a first input terminal, a second input terminal, a first output terminal, a second output terminal, a third output terminal, and a fourth output terminal, comprising:

a voltage regulator coupled to the first input terminal and coupled to the first output terminal, the voltage regulator providing on the first output terminal an output voltage within a second predetermined voltage range if an input voltage on the first input terminal is within a first predetermined voltage range;

a device driver coupled to the second output terminal; and a warning signal driver which generates a warning signal on the third output terminal if the output voltage is not within the second predetermined voltage range, wherein the fourth output terminal is a fault output terminal, the device driver comprising a current monitor circuit and the warning signal driver comprising a current monitor circuit, a fault signal being asserted onto the fourth output terminal if the current monitor circuit of the device driver detects an error condition on the second output terminal or if the current monitor circuit of the warning signal driver detects an error condition on the third output terminal, and wherein the second input terminal is a lamp inrush terminal, a capacitance on the lamp inrush terminal determining at least in part a period of time in which a high current error condition on the third output terminal does not result in the fault signal being asserted onto the fourth output terminal.

15. An integrated circuit, comprising:

a voltage regulator circuit coupled to a voltage input terminal of the integrated circuit and coupled to a voltage output terminal of the integrated circuit;

a reset circuit coupled to the voltage regulator circuit and coupled to a reset output terminal of the integrated circuit;

a first driver circuit coupled to a first driver output terminal and coupled to a first driver input terminal, the first driver circuit comprising means for causing a fault signal to be output from a fault output terminal of the integrated circuit if an incorrect amount of current is flowing through the first driver output terminal; and a second driver circuit coupled to a second driver output terminal and coupled to a second driver input terminal, the second driver circuit comprising means for causing a fault signal to be output from the fault output terminal of the integrated circuit if an incorrect amount of current is flowing through the second driver output terminal.

16. The integrated circuit of claim 15, wherein said means for causing a fault signal of the first driver circuit comprises means for determining if a current flowing through the first driver output terminal is within a predetermined range, and wherein said means for causing a fault signal of the second driver circuit comprises means for determining if a current flowing through the second driver output terminal is within a predetermined range.

17. The integrated circuit of claim 15, wherein the integrated circuit also has reset delay input terminal, the reset circuit being coupled to the reset delay input terminal.

18. An integrated circuit, comprising:

a voltage regulator circuit coupled to a voltage input terminal of the integrated circuit and coupled to a voltage output terminal of the integrated circuit;

a reset circuit coupled to the voltage regulator circuit and coupled to a reset output terminal of the integrated circuit;

a first driver circuit coupled to a first driver output terminal and coupled to a first driver input terminal, the first driver circuit comprising means for causing a fault signal to be output from a fault output terminal of the integrated circuit if an incorrect amount of current is flowing through the first driver output terminal;

a second driver circuit coupled to a second driver output terminal and coupled to a second driver input terminal, the second driver circuit comprising means for causing a fault signal to be output from the fault output terminal of the integrated circuit if an incorrect amount of current is flowing through the second driver output terminal; and an inhibit input terminal coupled to the means for causing a fault signal of the first driver circuit and coupled to the means for causing a fault signal of the second driver circuit.

* * * * *